United States Patent [19]

Morimoto et al.

[11] Patent Number: 5,257,255
[45] Date of Patent: Oct. 26, 1993

[54] RECORDING AND/OR REPRODUCING APPARATUS WITH SENSOR FOR DETECTING HEAD SPEED OR ACCELERATION

[75] Inventors: Masao Morimoto, Chichibu; Hitoshi Kurihara, Yoi-machi; Ryuichi Negishi, Chichibu; Toru Okada, Kumagaya; Masae Ikeda, Chichibu, all of Japan

[73] Assignee: Canon Denshi Kabushiki Kaisha, Chichibu, Japan

[21] Appl. No.: 921,439

[22] Filed: Jul. 31, 1992

Related U.S. Application Data

[63] Continuation of Ser. No. 329,761, Mar. 28, 1989, abandoned.

[30] Foreign Application Priority Data

| Mar. 30, 1988 | [JP] | Japan | 63-74615 |
| Apr. 1, 1988 | [JP] | Japan | 63-78086 |
| Apr. 28, 1988 | [JP] | Japan | 63-108809 |
| May 6, 1988 | [JP] | Japan | 63-109106 |
| May 6, 1988 | [JP] | Japan | 63-109107 |
| May 12, 1988 | [JP] | Japan | 63-114550 |

[51] Int. Cl.$^5$ ............ G11B 19/04; G11B 27/36
[52] U.S. Cl. ............ 369/53; 369/44.31; 360/60; 360/78.04; 324/173
[58] Field of Search ............ 360/60, 69, 75, 77.03, 360/78.04–78.14, 105, 106; 369/32, 33, 41, 53, 44.31, 58, 219, 221, 233, 239; 318/135; 324/163, 173, 174; 310/12–15

[56] References Cited

U.S. PATENT DOCUMENTS

| 4,692,915 | 9/1987 | Moriya et al. | 369/53 |
| 4,792,707 | 12/1988 | Katanuma | 310/12 |
| 4,803,572 | 2/1989 | Haruna et al. | 360/60 |
| 4,906,923 | 3/1990 | Aoyama | 324/173 |
| 4,967,293 | 10/1990 | Aruga et al. | 360/78.12 |

*Primary Examiner*—Jerry Smith
*Assistant Examiner*—Steven R. Garland
*Attorney, Agent, or Firm*—Spencer, Frank & Schneider

[57] ABSTRACT

A head for writing data into and/or reading data out of a recording medium such as a magnetic disc is displaced along a path by a motor such as a voice coil motor. The moving member of the motor is disposed on one side of the path; and another moving member of a speed sensor for detecting the head displacement speed is disposed on the opposite side. As a result, an unbalanced mass arrangement with respect to the path along which the head is displaced will not occur. The signal from the speed sensor can be used, for example, to interrupt a write operation if a mechanical impact occurs. Furthermore, even in an embodiment in which a coil is wound around the moving member of the speed sensor so that the head displacement speed is detected as a voltage induced across the coil as the head is displaced, the motor and the speed sensor are disposed in spaced-apart-relationship with each other and the speed sensor is less susceptible to adverse effects caused by the leakage flux from the motor.

19 Claims, 18 Drawing Sheets

RECORDING AND/OR REPRODUCING APPARATUS WITH SENSOR FOR DETECTING HEAD SPEED OR ACCELERATION

This application is a continuation of application Ser. No. 07/329,761, filed Mar. 28th, 1989, now abandoned.

BACKGROUND OF THE INVENTION

1. Field of the Invention

The present invention relates to a recording and/or reproducing apparatus for writing data into and/or reading data out of a recording medium.

2. Description of the Prior Art

Various apparatuses to write data into or read data from recording media are now available, including magnetic hard disc apparatuses, magnetic floppy disc apparatuses, optical disc apparatuses, optical card apparatuses and so on. With these apparatuses, a magnetic head or an optical head is used to write and/or read out data into/from a track defined on the surface of a recording medium.

These apparatuses have been widely used as information and video apparatuses. Recently, there is an increasingly strong demand for increasing the data storage capacity and making such apparatuses and recording media more compact in size. Thus it is essential to increase the data-packing density. For instance, magnetic disc apparatuses generally use discs of the so-called double-density type, each having a data packing capacity of two megabytes, or discs having even higher data-packing densities of ten or more megabytes. In order to use discs having a super high data-packing density of between five and ten megabytes, motors which are capable of a super high degree of accuracy are needed, so that instead of the conventional DC motors, linear pulse motors have been now devised and demonstrated.

However, the assembly of a disc apparatus with such a linear pulse motor requires an extremely high degree of accuracy, which increases the production costs. Therefore, instead of a linear pulse motor, a voice coil motor capable of positioning a magnetic or an optical read/write head properly on a desired track at a high speed has been used as the head driving means because they are available at reasonable prices.

When a voice coil motor is used as the means for moving a write/read head, in order to control the relative position of the head with respect to the disc, a linear encoder which is driven by the voice coil motor is employed so as to detect the displacement of a carriage upon which the head is mounted.

Meanwhile, in order to increase the data-packing density of the discs as described above, it is essential to reduce the width of each track and to reduce the pitch between the adjacent tracks, so that the number of tracks defined on one surface of the recording medium can be increased. However, when the track width and pitch are reduced, an impact exerted from the exterior of the recording and/or reproducing device can easily displace the magnetic head from the desired track, and in some cases, the head may be moved to the adjacent track. If such erroneous positioning of the head occurs when data is being written on the surface of the recording medium, the desired data cannot be read out from the desired track and the data stored in the adjacent track is destroyed.

The above and other problems encountered in the conventional data recording and/or reproducing apparatuses will be described in detail in conjunction with a magnetic disc apparatus utilizing a tracking servo system. The tracking servo system has been devised and demonstrated to alleviate the problem that the desired data sometimes cannot be correctly written into and/or read from a high density recording medium with many tracks by a head positioning apparatus of the type which moves the head only by a predetermined number of steps. The tracking servo system is such that servo data is read from the surface of the recording medium and the head is positioned on the desired one of a large number of data tracks defined at a high degree of density.

FIG. 1 is a block diagram illustrating the servo system of a conventional magnetic apparatus and FIG. 2 is a schematic view illustrating the tracks and servo data defined on a magnetic disc used in the apparatus shown in FIG. 1.

Referring now to FIGS. 1 and 2, reference numeral 24 represents a magnetic disc spun by a spindle motor (not shown); 26 represents a magnetic read/write head for reading data out and writing data into the surface of the magnetic disc 24; 1003 represents a write circuit for applying a write current to the magnetic head 26; 1004 represents a read amplifier for amplifying the data read out from the surface of the magnetic disc 24 by the magnetic head 26; 1005 represents a servo data signal detector for detecting the servo data signal from the amplified read out data from the amplifier 1004; 1006 represents a positioning error detector for generating a positioning error signal in response to the servo data signal detected by the detector 1004; 1007 represents microcomputer responsive to the output signal from the detector 1006 for computing motor control data; 1008 represents a D/A converter for converting the motor control signal derived from the computer 1007 into an analog motor control signal; 1009 represents a power amplifier for amplifying the analog motor control current signal derived from the D/A converter 1008; and 1010 represents a linear motor for moving the magnetic head 26 in the directions indicated by the double arrow and perpendicular to the tracks defined on the surface of the disc 24, thereby positioning the head 26 over a desired track properly. A large number of tracks 1011 are defined over the surface of the magnetic disc 24 and each track 1011 is divided into a plurality of sectors. A servo signal region 1012 is defined between the adjacent sectors of each track 1011. Various kinds of servo signals may be used and in this specification, as an example, burst signals 1013 and 1014 having different frequencies $f_1$ and $f_2$ which are spaced apart from each other in the radial direction of the magnetic disc 24 and which are offset from the tracks by one half of the track pitch as shown in FIG. 2 will be described.

In the case of tracking along the center line of the track 01 (T01), the head 26 reads out both the burst signals 1013 and 1014 simultaneously at each servo region 1012 so that signals $f_1$ and $f_2$ having the same amplitude can be obtained by frequency discrimination. However, if the magnetic head 26 deviates slightly from the center line of the track 01 (T01) toward the adjacent track 00 (T00), the amplitude of the signal $f_2$ becomes greater than that of the signal $f_1$. In response to the difference in amplitude between the signals $f_1$ and $f_2$, a positioning error is computed and utilized to control the position of the magnetic head 26 by the microcomputer 1007.

In the conventional apparatuses of the type described above, servo data are intermittently obtained from the servo data regions. When an external impact is exerted on the apparatus, the magnetic head may deviate radially inwardly or outwardly from the center line of the predetermined track. But the microcomputer cannot detect the deviation when the magnetic head is away from the servo signal regions, so that the operation of the magnetic head is continued. If the deviation of the magnetic head from the center line of a predetermined track occurs during a writing operation, the recorded data recorded on the adjacent track are completely destroyed in the worst case.

SUMMARY OF THE INVENTION

In view of the above, a first object of the present invention is to provide a recording and/or reproducing apparatus which can position a head carriage with a high degree of accuracy on a predetermined track and which is completely free from improper operation due to external impacts exerted on the apparatus.

A second object of the present invention is to provide a recording an/or reproducing apparatus which includes a speed sensor to control the displacement of the head carriage and which, even if a voice coil motor is utilized as the means for driving the head carriage, is not adversely affected by the leakage flux from the voice coil motor.

A third object of the present invention is to dispose a speed sensor without unbalancing the geometrical arrangement of the mass.

A fourth object of the present invention is to reduce the leakage flux or the loss of magnetic flux from a coil used in a speed sensor.

A fifth object of the present invention is to provide a recording and/or reproducing apparatus in which the head carriage can be displaced at a high speed with less consumption of electric power.

A sixth object of the present invention is to provide a recording and/or reproducing apparatus which can protect the data stored at a track and its adjacent tracks even when a mechanical disturbance such as an external impact is exerted on the apparatus during the data writing or erasure operation.

In a first aspect of the present invention, a recording and/or reproducing apparatus comprises:

a head for writing data into and/or reading data out of a recording medium;

a motor for displacing the head along a path to a write or read region on the surface of the recording medium, the motor having a moving member disposed on one side of the path, the moving member being joined to the head or a head carriage upon which the head is mounted; and a speed sensor means for detecting the displacement speed of the head, the speed sensor having a moving member joined to the head or the head carriage on the other side of the path.

The motor may be a linear voice coil motor. The speed sensor means may have a coil wound around its moving member, a yoke extended through the coil and securely attached to the apparatus, and a magnet combined with the yoke.

The recording medium may be in the form of a disc over the surfaces of which are defined a plurality of the read/write regions, and the head may be moved toward or away from the center of the disc.

Here, the disc-shaped recording medium may be a magnetic disc, and the head may be a magnetic head.

The recording and/or reproducing apparatus may further comprise a control means for permitting or inhibiting the write operation of the head in response to the displacement speed of the head detected by the speed sensor means.

Here, the apparatus may further comprise a differentiating circuit for differentiating the output from the speed sensor means, and the control means may inhibit the write operation of the head when the output from the differentiating circuit is in excess of a predetermined level.

In a second aspect of the present invention, a recording and/or reproducing apparatus comprises:

a head for writing data into and/or reading out of a recording medium;

a head displacement means for displacing the head to a write or read region of the recording medium; and a speed sensor means for detecting the displacement speed of the head, the speed sensor means having a coil assembly comprising a first coil movable in unison with the head or a head carriage upon which the head is mounted, and a second coil which is maintained stationary relative to the head and which is wound in a direction opposite to the direction of winding of the first coil, whereby in response to the voltage induced across the coil assembly when the head is displaced, the displacement speed of the head is detected.

Here, the head displacement means may have a linear voice coil motor equipped with a moving member joined to the head or the head carriage.

The moving member may be joined to the head on one side of the path of displacement of the head and the first coil may be wound around a moving member joined to the head on the other side of the path.

In a third aspect of the present invention, a recording and/or reproducing apparatus comprises:

a head for writing data into and/or reading data out of a recording medium;

a head displacement means for displacing the head to a write or read region on the recording medium; and a speed sensor means for detecting the displacement speed of the head, the speed sensor means having a first yoke in the shape of a hollow cylinder parallel to the path of displacement of the head, a magnetic lining over the inner surface of the first yoke, a second yoke in the shape of a rod disposed in the first yoke coaxially thereof, and a moving member which is joined to the head or a head carriage upon which the head is mounted through a slit cut through the first yoke and the lining, the slit being parallel with the path of the displacement of the head so that the moving member is movable in unison with the head or head carriage along the second yoke, the moving member being wound with a coil.

The head displacement means may have a linear voice coil motor which has a moving member connected to the head or the head carriage.

The moving member of the head displacement means and the movable member of the speed sensor means may be arranged on opposite sides of the path of displacement of the head.

In a fourth aspect of the present invention, a recording and/or reproducing apparatus comprises:

a head for writing data into and/or reading data out of a recording medium;

a head displacement means for displacing the head relative to the recording medium, thereby positioning the head on a write or read region of the recording medium;

an acceleration data generating means for generating data concerning the acceleration of the head relative to the recording medium; and a control means for permitting or inhibiting the write operation of the head in response to the data delivered from the acceleration data generating means.

Here, the acceleration data generating means may have a speed sensor means for detecting the relative speed of the head with respect to the recording medium and a differentiating circuit for differentiating the output from the speed sensor means, whereby the control means inhibits the write operation of the head when the output from the differentiating circuit is in excess of a predetermined level.

Alternatively, the acceleration data generating means may have an acceleration sensor means for detecting the acceleration of the head relative to the recording medium, whereby the control means inhibits the write operation of the head when the output from the acceleration sensor means is in excess of a predetermined level.

In a fifth aspect of the present invention, a recording and/or reproducing apparatus comprises:

a head for writing data into and/or reading data out of a recording medium;

a head displacement means for displacing the head relative to the recording medium so as to position the head properly on a write or read region of the recording medium;

an acceleration data generating means for generating data concerning the relative acceleration of the head with respect to the recording medium; and a control means for causing the head displacement means to displace the head by a distance corresponding to the acceleration in response to data delivered from the acceleration data generating means.

The head displacement means may include a motor; the acceleration data generating means may comprise an acceleration sensor; and the control means may add the output from the acceleration sensor to data for energizing the motor.

The control means may have an adder.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 3:
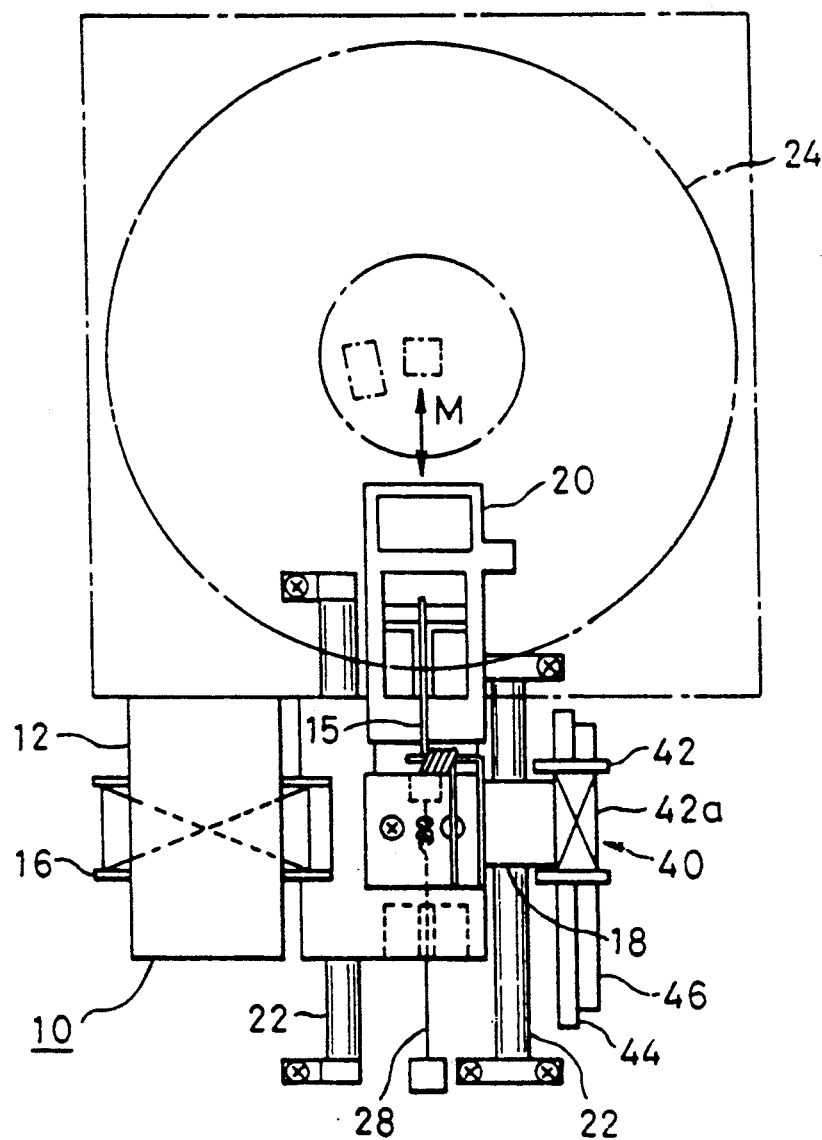
FIG. 3 is a top view of a first preferred embodiment of a recording and/or reproducing apparatus in accordance with the present invention.
Figure 4:
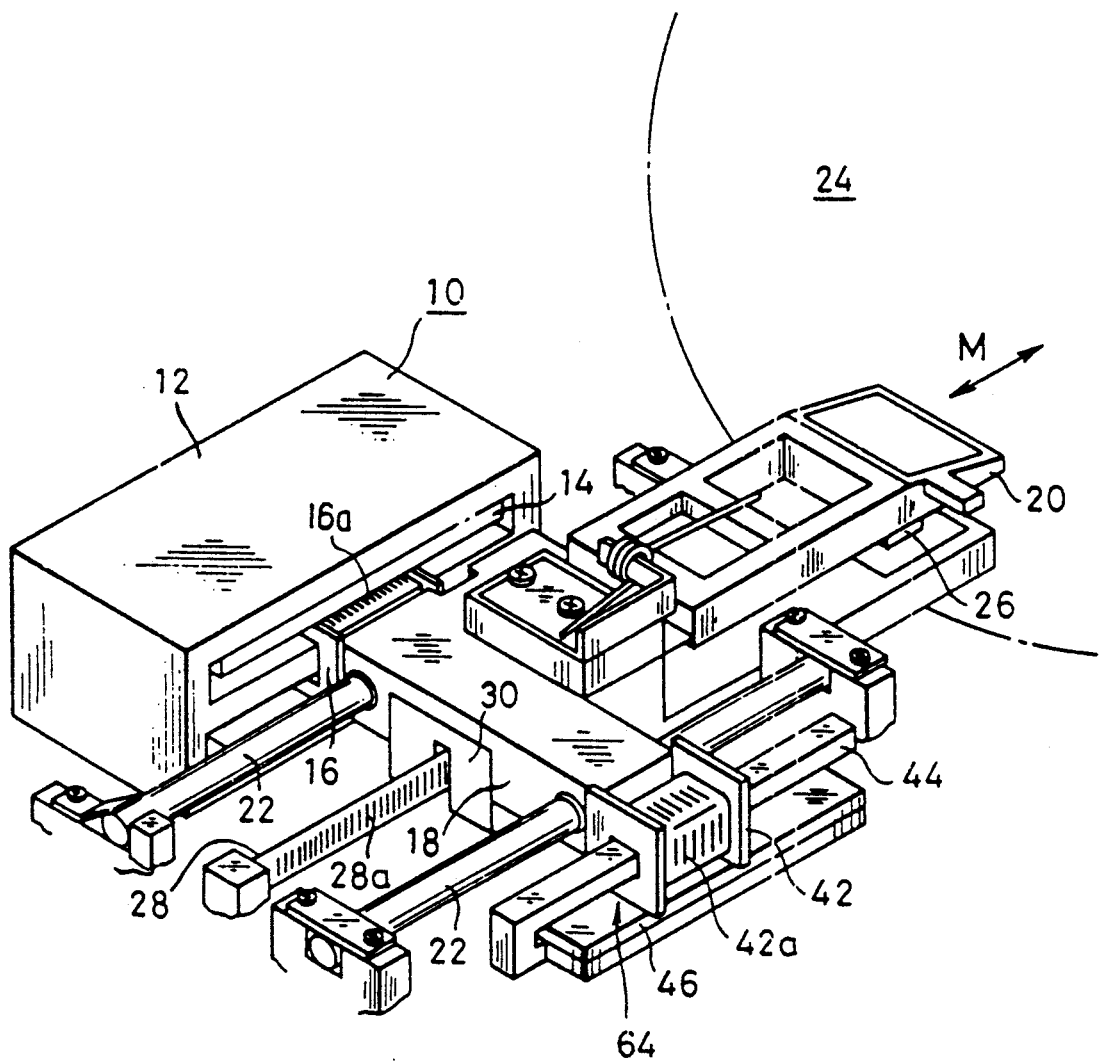
FIG. 4 is a perspective view thereof.

Referring first to FIGS. 3 and 4, a first preferred embodiment of a recording and/or reproducing apparatus in accordance with the present invention will be described in detail below. The apparatus has a voice coil motor (to be referred to as "VCM" hereinafter in this specification) 10, and within a yoke 12 of VCM 10 are disposed a magnet 14 and a moving member 16 with a coil 16a. A head carriage 18 is integrally mounted on the moving member so that when a current flows through the coil 16a, the moving member 16 is displaced by the interaction between the magnetic fields produced by the coil 16a and the magnet 14 and consequently the head carriage 18 is also displaced in unison with the moving member. A head arm 20 is integrally mounted on the head carriage 18. The head arm 20 is guided by a pair of guide bars 22 which extended through the head carriage 18 in the direction of the displacement thereof. Guide bars 22 are mounted on the apparatus in such a manner that the head arm 20 moves toward or away from the center of a disc 24 in the direction of the center line M during a seek operation for positioning head 26 over a desired track from which data is to be read or recorded. A pair of read/write heads 26 are carried by the head arm 20 so as to write and read out data into and from the disc 24 and to erase data stored thereon. The pair of read/write heads (one of which is opposite the undersurface of the disc 24 and is not shown) are normally biased by bias springs 15 so as to clamp the disc 24 under a suitable pressure.

An encoder 28 extends parallel to the pair of guide bars 22. The encoder 28 is inserted into a notch portion of the head carriage 18 and is securely attached to the apparatus through a suitable elastic member. The encoder 28 has a plurality of slits 28a spaced apart from each other by a predetermined distance so that a light beam emitted from a light emitting element of a photointerruptor 30 is detected by a photodetector of the photointerruptor 30 through these slits 28a. The number of slits 28a which have passed the photodetector is counted so as to detect the displacement of the moving member 16 in unison with the head carriage 18. That is, the displacement of the head 26 can be detected.

In the first embodiment, the encoder 28 is arranged in the vicinity of the center line M in the direction of the displacement of the head. The encoder 28 extends substantially along the center line of the head carriage 18. The photointerruptor 30 is attached to the head carriage 18 in such a way that the encoder 28 is put between the light emitting element and the photodetector. The photointerruptor 30 is provided, for instance, with two light-emitting-element and photodetector pairs. The number of slits of the encoder 28 is counted when the head carriage 18 is displaced, so that the displacement of the head carriage 18 and the corresponding displacement of the head 26 can be detected. The phase relationship between the output signals from the two photodetectors is detected and to permit the direction of the displacement to be determined.

A speed sensor 64 is disposed on the side opposite the VCM 10 with respect to the center line M (that is, on the right side in FIGS. 3 and 4) and comprises a moving element 42 attached to the carriage 18, a coil 42a wound around the moving member, an iron yoke 44 extended through the coil 42a and attached to the apparatus and a magnet 46 attached to the iron yoke 44.

When the moving element 42 is displaced in unison with the head carriage 18, a current is generated by the interaction between the magnetic fields produced by the coil 42a wound around the moving element 42 and by the magnet 46 attached to the iron yoke 44, so that by picking up the current thus generated through the coil 42a the speed is detected.

Next a control system with means for controlling the position of the heads for the first embodiment, with the above-described construction, will be described with reference to the block diagram shown in FIG. 5.

A microcomputer 62, which serves as a control means for accomplishing various control functions, exchanges read data, write data and control signals through an interface (not shown) with an external host system.

Positioning data for moving the heads to a desired position is obtained from input means such as the host system, a keyboard or the like (not shown) or is based on data stored in a storage device of the microcomputer 62. In response to the positioning data, microcomputer 62 applies a displacement command to a D/A converter 75. An analog displacement signal a derived from the D/A converter 75 is delivered through an adder 54 and a power amplifier 50 to VCM 10, whereby the latter is energized. Because of the interaction between the current flowing through the coil 16a and the magnet 14, the head carriage 18 and the moving member 16 are displaced in unison along the guide bars 22.

When the head carriage 18 is displaced, information concerning the displacement is generated by photointerruptor 30, which cooperates with the encoder 28 attached to the apparatus. This information is in the form of two signals $\phi A$ and $\phi B$, which are out of phase by, for instance, 90°.

The output signals from the photointerruptor 30 are first delivered to a differential amplifier 52 so that coarse positioning of the head can be performed with respect to a reference point at which the signal waveforms cross each other (that is, at which no phase difference exists between the two output signals). The output signal from the differential amplifier 52 is delivered as the coarse positioning signal b to the adder 54.

The output signals from the photointerruptor 30 (for instance, in the form of a quasi-sinusoidal waveform) are delivered to comparators 56 and 58 and are compared with reference signals, respectively. The outputs from the comparators 56 and 58, each of which is in the form of a rectangular waveform, are applied to a track counter 60 which counts in one direction or the other, opposite direction. The output c from the track counter 60 is delivered to the microcomputer 62 as a signal representative of the present position of the head.

The data concerning the displacement speed of the head carriage detected by the speed sensor 64 is amplified by an amplifier 66, the output of which in turn is delivered to a phase compensation circuit 67. The phase compensation circuit 67 generates a signal d whose phase is compensated for. The signal d is delivered to the adder 54, thereby preventing oscillations caused by an erroneous phase. The output signal f from the amplifier 66 is delivered to the microcomputer 62 in order to control the displacement speed.

The signal representative of the displacement speed of the head carriage, detected by the speed sensor 64 and amplified by the amplifier 66, is also delivered to a differentiating circuit 68, the output of which in turn is delivered to a comparator 70 for comparison with a predetermined value Vr. If a speed variation in excess of the reference value is applied to the comparator 70, the output e thereof is delivered to the microcomputer 62. Then the microcomputer 62 interrupts the writing operation so that the destruction of data due to an impact or the like can be prevented. Another embodiment of the means for protecting the data against impacts or the like will be described in detail below.

The data recorded on the surface of the disc 24 is read and amplified by an amplifier 72. The output of amplifier 72 includes servo data which is detected by a servo data detection circuit 73 and is delivered to a positioning error detector 74. The output of positioning error detector 74 is supplied as a positioning error signal g for tracking to the microcomputer 62.

The displacement of head carriage 18 is controlled in response to the coarse positioning signal b and the phase compensated speed signal d directly applied to the adder 54, and also in response to the signal c representative of the present position of the head, the displacement speed signal f, the signal e for detecting impacts due to the speed variations in the write operation, and the tracking servo signal g applied to the microcomputer 62. For instance, when the number of counts stored in the microcomputer 62 and representative of a desired head position coincides with the number of counts obtained by the track counter 60 in response to the relative displacement of the encoder 28 and the photointerruptor 30, the signal a becomes "0" and then the output from the differential amplifier 52 becomes "0", so that the head is topped at a predetermined slit position corresponding the desired track.

The operation of the first embodiment will be further described later in conjunction with an embodiment (FIG. 14) for protecting data mainly against impacts or the like.

Figure 6:
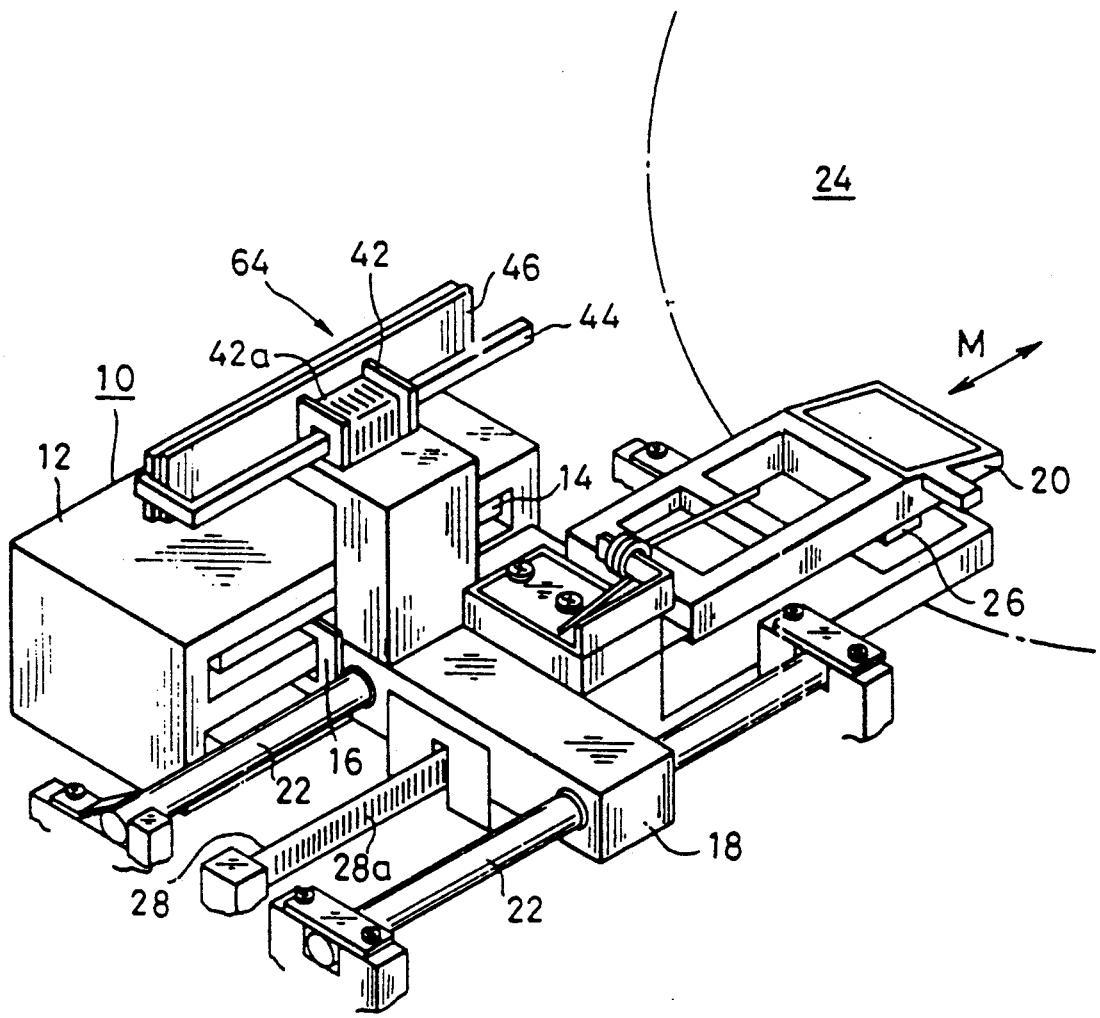
FIG. 6 is a perspective view illustrating a prototype magnetic disc apparatus for the sake of comparison with the first preferred embodiment of the present invention.

In the case of an apparatus of the type in which the speed sensor 64 is integral with VCM 10 or is disposed adjacent thereto as shown in FIG. 6, the leakage flux from VCM 10 adversely affects the detection by the speed sensor 64. Furthermore, an unbalanced mass arrangement results. That is, when the speed sensor 64 is disposed as shown in FIG. 6, strong leakage flux from the voice coil motor 10 adversely affects the operation of the speed sensor, resulting in a diminished degree of accuracy in the detected speed of the head carriage. In addition, the combined mass of the moving members of the voice coil and the speed sensor act only on one side of the center line of M, so that an unbalanced inertia force acts on the head displacement mechanism and consequently the movement of the head is affected. On the other hand, according to the first embodiment of the present invention, the speed sensor 64 is disposed on the opposite side of VCM 10 with respect to the center line M of the displacement of the head 26 so that the above-described problems are substantially solved.

That is, according to the first embodiment, the leakage flux from VCM 10 will not adversely affect the speed sensor 64 and errors in the position of the heads due to an unbalanced mass arrangement are avoided, so that a disc apparatus with a speed sensor with a high degree of accuracy can be provided.

Next a modification of the speed sensor 64 will be explained.

In order to further increase accuracy in the detection of the displacement speed by a speed sensor of the type described above, a construction in which two speed sensors are provided can be used. In such a construction, the coils wound around the respective speed sensors are wound in opposite directions and the polarities of the magnets are opposite, whereby the sum of the outputs from both coils are derived. According to this arrangement, the detection capability can be increased and adverse effects on the speed sensors due to the magnetic field from the VCM and the external magnetic field can be eliminated, so that the level of noise can be decreased.

However, with the above-described construction, the moving mass carried by the head carriage is increased, and power consumption is increased accordingly. Therefore the displacement speed of the head carriage is limited and the electric power consumption is troublesome.

Second Embodiment

Figure 7:
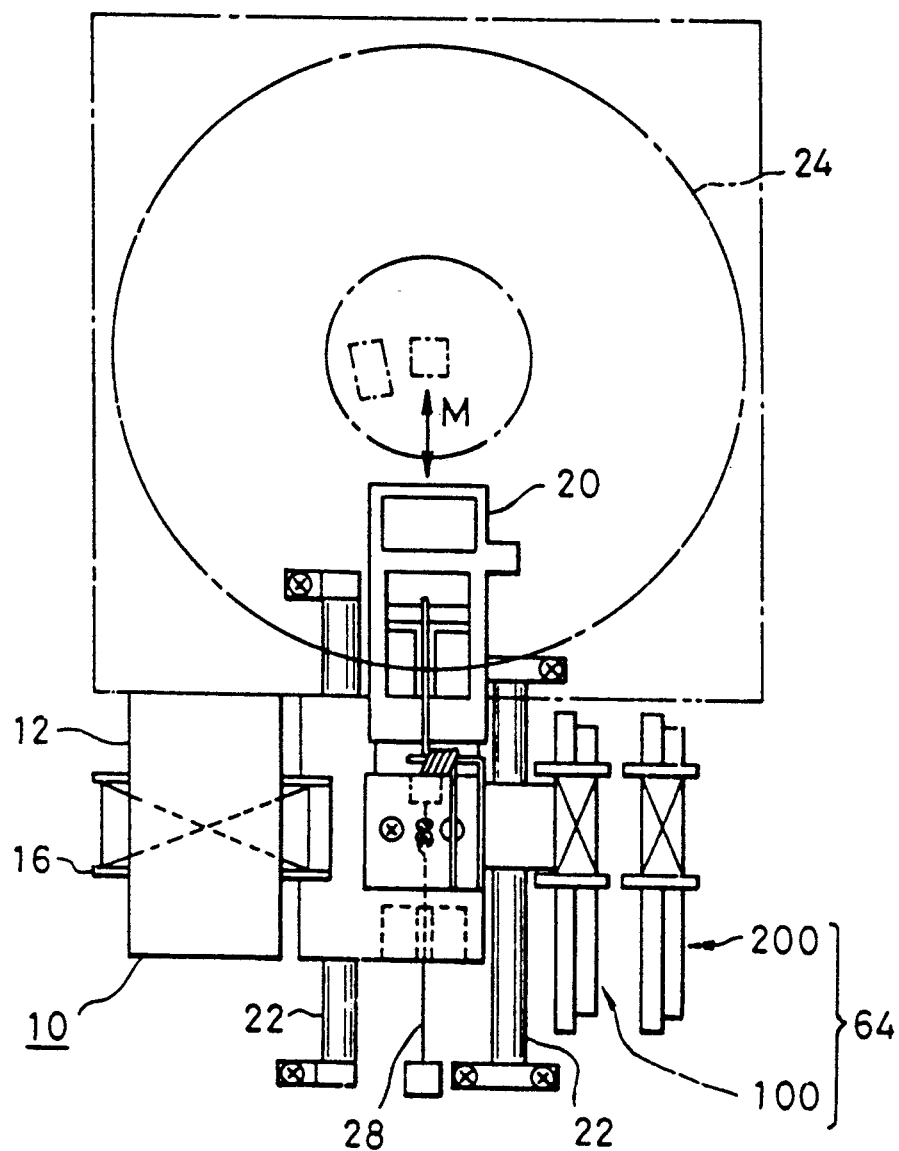
FIG. 7 is a top view illustrating a second preferred embodiment of a recording and/or reproducing apparatus in accordance with the present invention.
Figure 8:
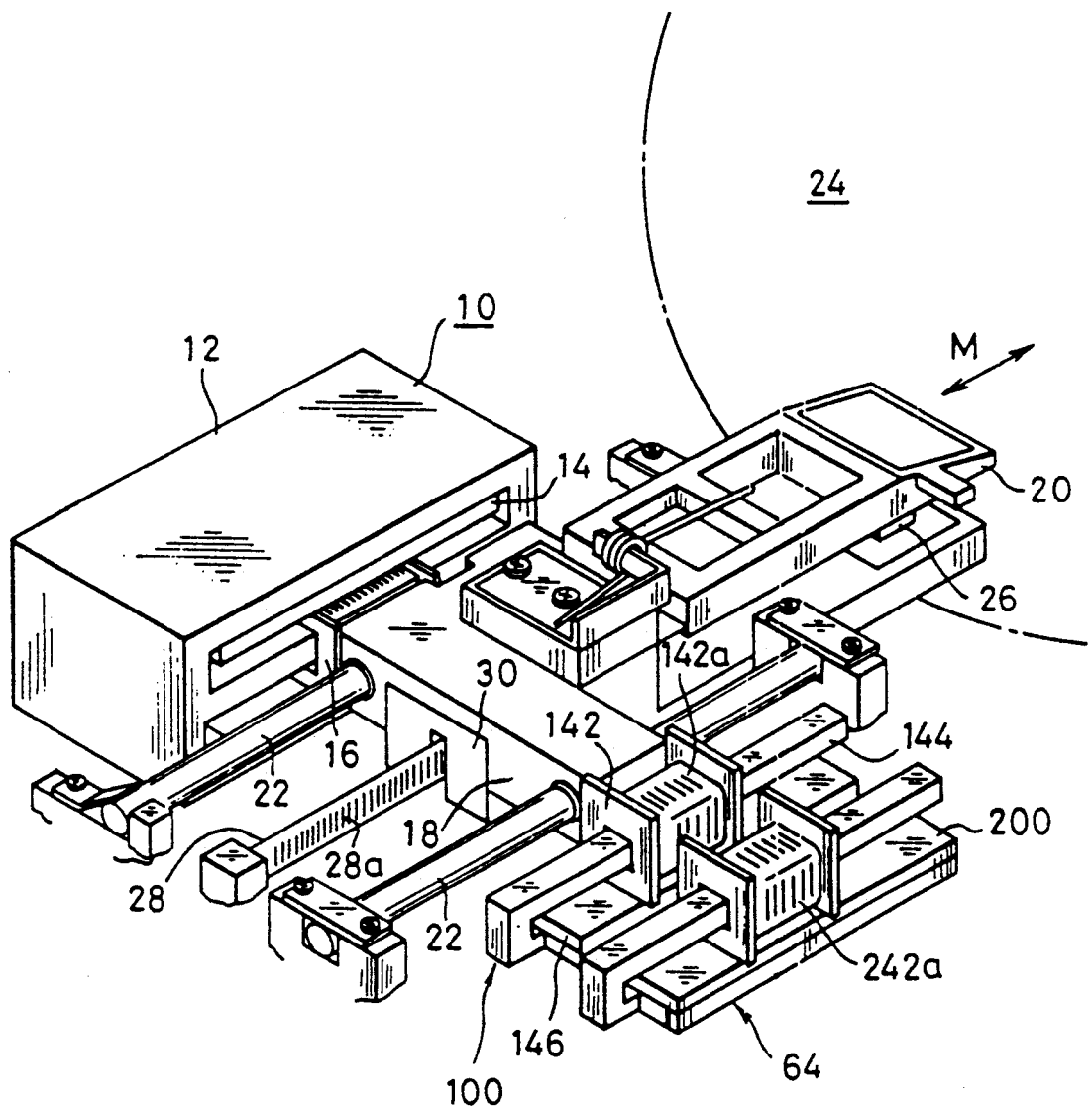
FIG. 8 is a perspective view thereof.

FIGS. 7 and 8 illustrate a second preferred embodiment of the present invention which can substantially solve these problems. As in the case of the first embodiment described above, in the second embodiment the speed sensor 64 is disposed on the opposite side (on the right side in FIGS. 7 and 8) of VCM 10 with respect to the center line M of the displacement of the head 26.

According to the second embodiment, the speed sensor 64 comprises a sensor unit 100 which moves in unison with the head carriage 18 and a stationary sensor unit 200. The sensor unit 100 comprises a moving member 142 formed integrally with the head carriage 18, a coil 142a wound around the moving member 142, an iron yoke 144 extending through the coil 142a of the moving member and securely attached to the apparatus, and a magnet 146 attached to the iron yoke 144.

The other sensor unit 200 is substantially similar in construction to the sensor unit 100 except that the sensor unit 200 is securely mounted on the disc apparatus and the coil 242a of the sensor unit 200 is wounded in the opposite direction of the coil 142a and then is connected thereto.

The head position control system described above with reference to FIG. 5 may be equally applied to the second embodiment, but the speed sensor 64 of the second embodiment operates in a manner to be described below.

The moving member 142 moves in unison with the head carriage 18 and, because of the interaction between the coil wound around the moving member 142 and the magnet 146 attached to the iron yoke 144, a voltage is induced across the coil 142a.

Figure 9:
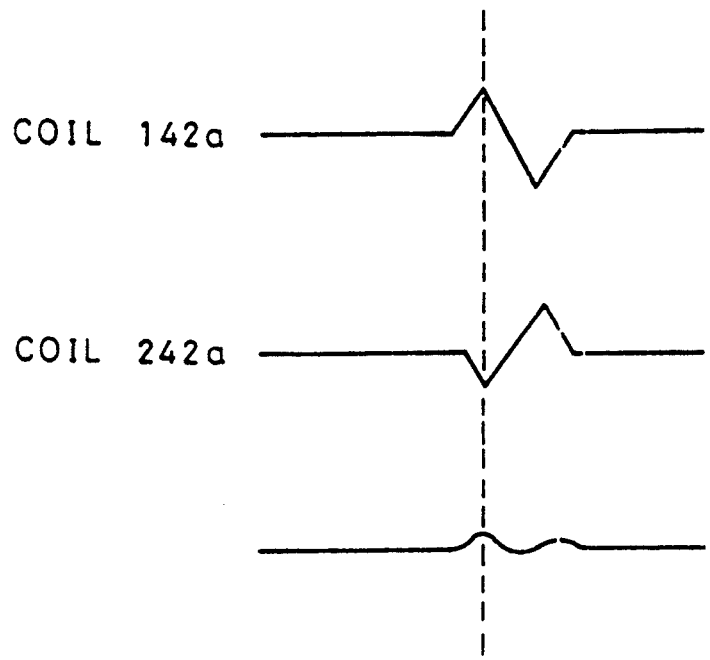
FIG. 9 is a diagram illustrating the waveforms of the outputs from a speed sensor coil arrangement used in the second preferred embodiment.

Since the coil 242a of the stationary sensor unit 200 is wound in the direction opposite to that of the coil 142a of the moving sensor unit 100, magnetic noise picked up by the coil 242a has a waveform opposite to that of the noise picked up by the moving sensor unit 100. When these waveforms are added together, the noise is cancelled as shown in FIG. 9. Meanwhile a voltage in proportion to the displacement speed is induced across the coil 142a, so that the displacement speed can be detected by detecting the voltage across the coil 142a. It is to be noted here that the magnet in opposing relationship with the coil 242a of the stationary sensor unit 200 may be eliminated or may be in the form of a simple yoke.

Returning to FIG. 5, the speed signal thus derived is delivered to the amplifier 66 and the output therefrom is applied to the phase compensation circuit 67. The phase-compensated output signal from the phase compensation circuit 67 is delivered as the signal d to the adder 54 so that the degree of controllability is further improved. The output signal f from the amplifier 66 is delivered to the microcomputer 62 in order to control the displacement speed of the head carriage 18. The mode of operation except as described above is substantially similar to that of the first embodiment described above, especially with reference to FIG. 5.

Modification of the Second Embodiment

Figure 10:
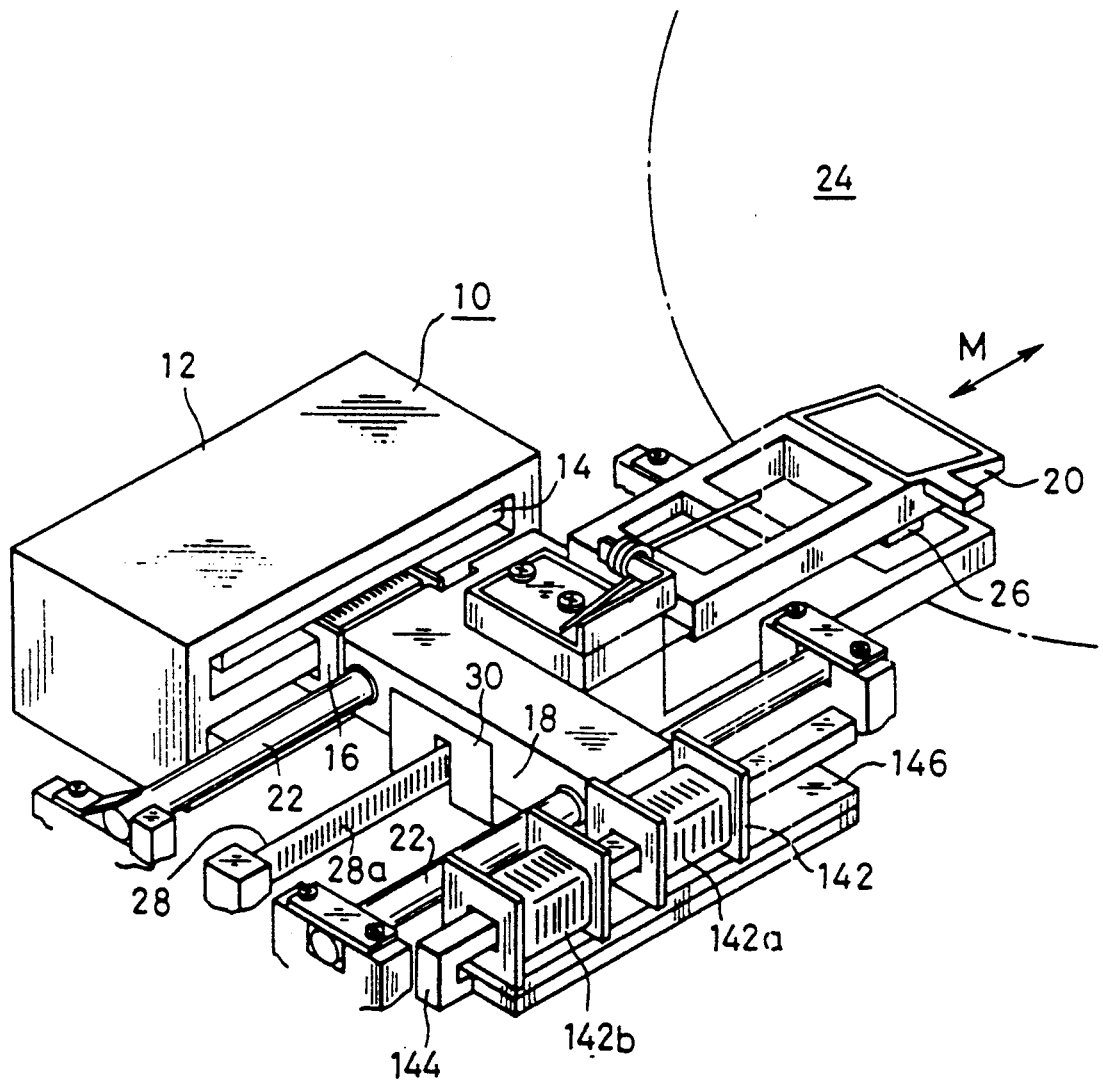
FIG. 10 is a perspective view illustrating a modification of the second preferred embodiment shown in FIGS. 7 and 8.

FIG. 10 illustrates a modification of the second embodiment just described above with reference to FIGS. 7 and 8, and is substantially 6 similar in construction to the second embodiment except that two the coils of two sensor units of the speed sensor 64 are arranged in the same magnetic circuit.

That is, the iron yoke 144 and the magnet 146 are used in common and one coil 142b is maintained stationary while the other coil 142a is movable in unison with the head carriage 18. Like the second embodiment, even in this modification, the coils 142a and 142b are wound in opposite directions.

Figure 11:
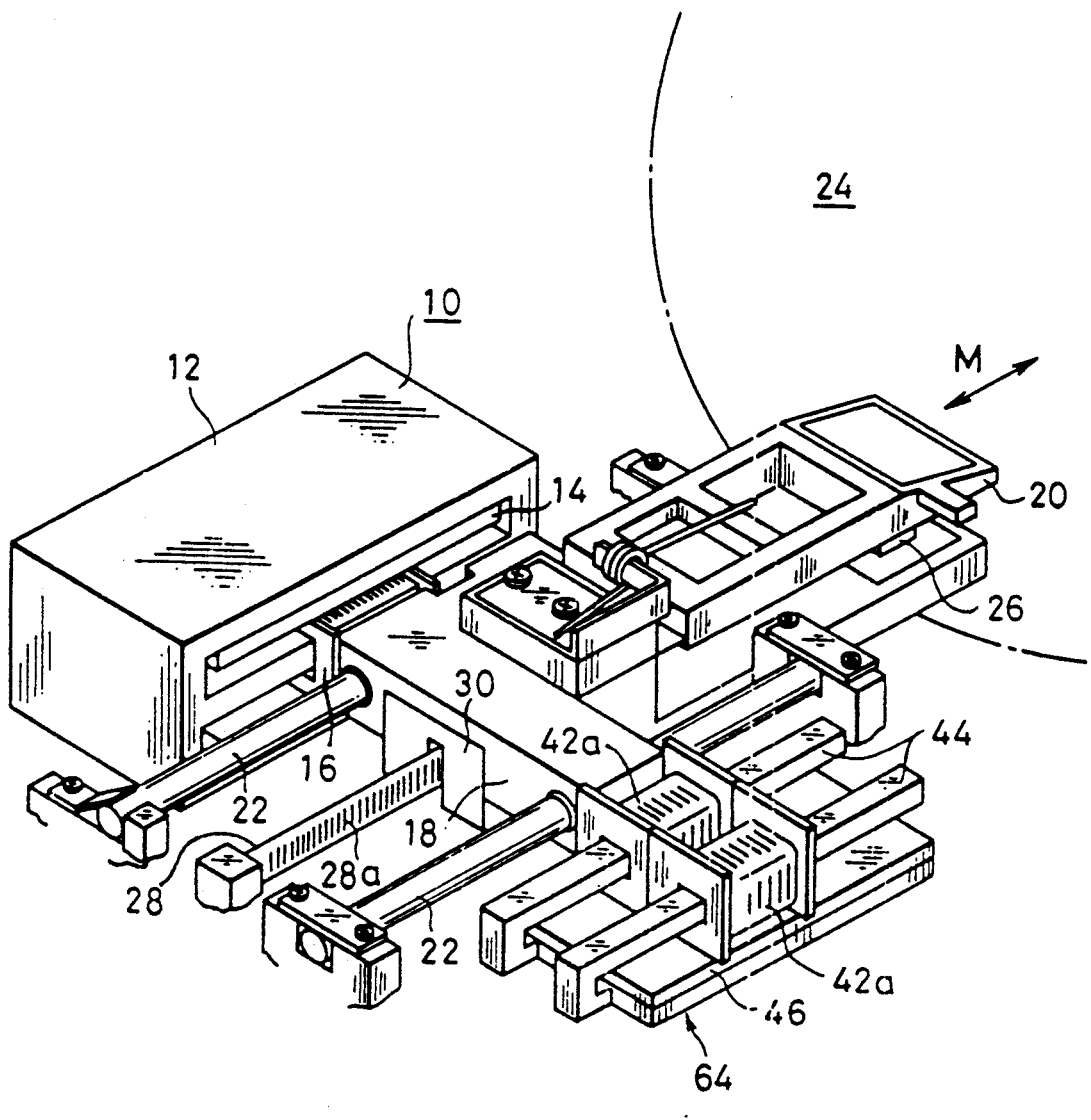
FIG. 11 is a perspective view illustrating a prototype magnetic disc apparatus for the sake of comparison with the second preferred embodiment of the present invention or the magnetic disc apparatus as shown in FIG. 10.

The mode of control of the modification is substantially similar to that of the second embodiment described above with reference to FIGS. 7 and 8, but since the iron yoke 144 and the magnet 146 are used in common the number of components to be assembled is decreased. Furthermore the picked-up noise is cancelled more efficiently because the same magnetic circuit is employed. If two coils 42a which are wound in opposite directions were integrally mounted on the head carriage 18 as shown in FIG. 11, the head carriage 18 would have to bear the weight of both the coils 42a. This would decrease the head carriage speed and increase the electric power consumption. Furthermore, the mass arrangement with respect to the center line of the displacement of the head would be unbalanced and various problems would arise. For instance, a greater inertial force would be exerted on the speed sensor. Such problems will never be observed in the second embodiment described above with reference to FIGS. 7 and 8 and the modification thereof described above with reference to FIG. 10.

That is, according to the second embodiment and its modification, the speed sensor comprises a first coil movable in unison with the head carriage and a second coil which is maintained stationary with respect to the head carriage and which is wound in a direction opposite to the direction of the winding of the first coil. As a result, external noise is cancelled by the addition of the output signals from the first and second coils and therefore common mode noise is reduced to a minimum.

Furthermore only the first coil moves in unison with the head carriage, so that the mass of moving parts is decreased. As a result, the displacement speed of the head carriage can be increased and the electric power consumption can be decreased.

Third Embodiment

Figure 12:
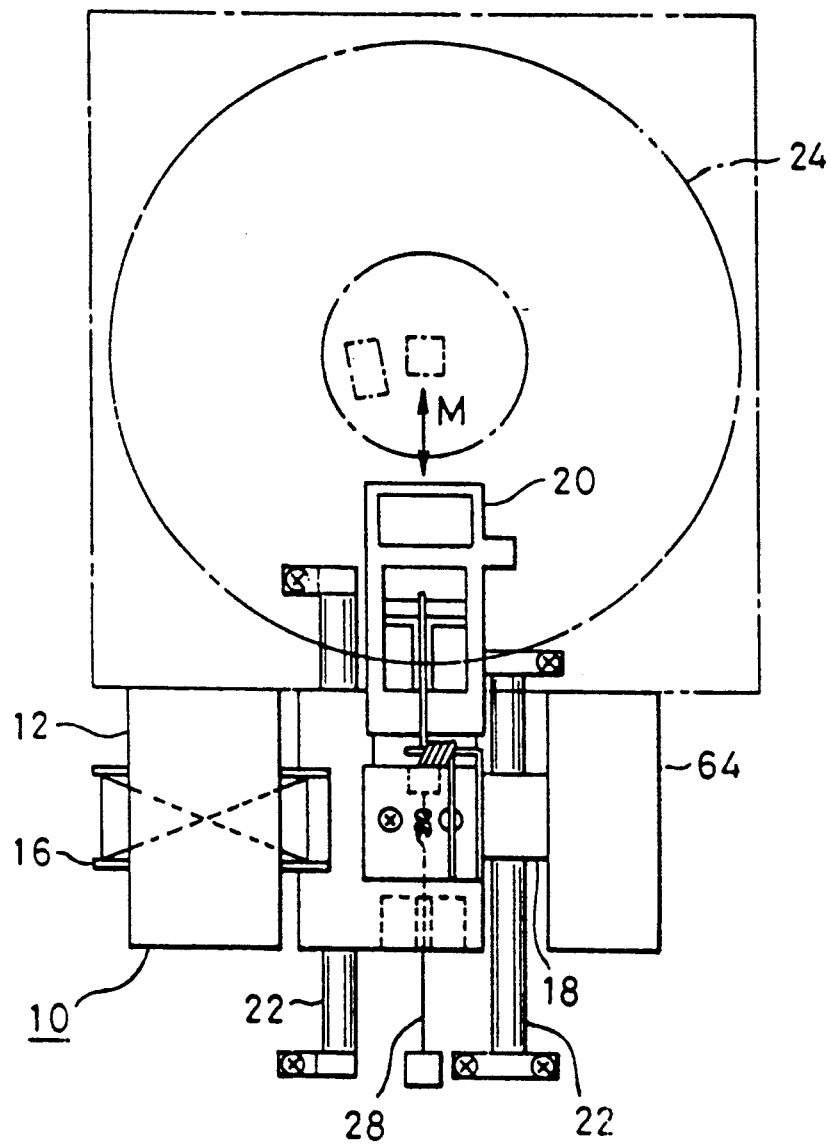
FIG. 12 is a top view of a third preferred embodiment of a recording and/or reproducing apparatus in accordance with the present invention.
Figure 13:
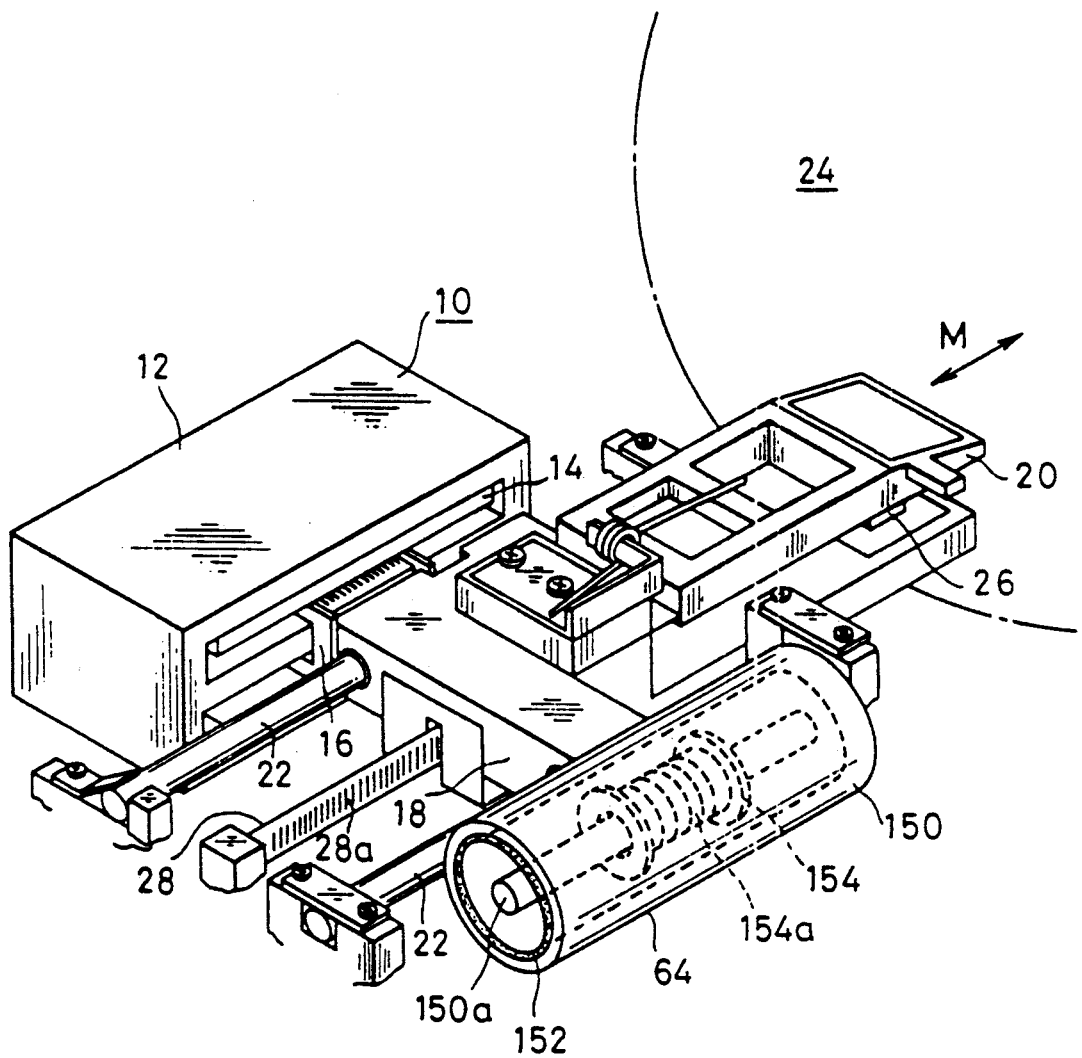
FIG. 13 is a perspective view thereof.

FIGS. 12 and 13 illustrate a third preferred embodiment of a recording and/or reproducing apparatus in accordance with the present invention. This embodiment is substantially similar in construction to the first embodiment described above with reference to FIGS. 3 and 4, and the head position control circuit described above with reference to FIG. 5 can be employed.

In the third embodiment, the speed sensor 64 is in the form of a cylindrical linear voice coil and has an outer cylindrical iron yoke 150 whose inner surface is lined with a hollow cylindrical magnet 152. An inner iron yoke 150a extends coaxially through the outer iron yoke 150. The iron yoke 150, the magnet 152 and the iron yoke 150a are integrally mounted on the disc apparatus by suitable joining member (not shown). The side of the iron yoke 150 facing the head carriage 18 is slit for a predetermined length corresponding to the range of displacement of the head carriage 18 (not shown). A moving member 154 is slidably supported on the iron yoke 150a and has a coil 154a whose windings are spaced apart by a predetermined distance. The moving member is securely attached to the head carriage 18 through the slit (not shown) of the outer iron yoke 150 so that the moving member 154 is guided by the inner iron yoke 150a and is displaced in unison with the head carriage 18.

When the moving member 154 is displaced in unison with the head carriage 18, a current is generated by the interaction between the coil 154a wound around the moving member 154 and the magnetic field of the magnetic 152 integral with the outer iron yoke. By detecting the current flowing through the coil 154a, the displacement speed can be sensed.

Since the speed sensor 64 has the outer cylindrical iron yoke 150, a closed magnetic circuit is established within the iron yoke 150. Leakage of magnetic flux to the exterior is prevented and the speed sensor 64 is not adversely affected by the external magnetic fields.

The disc apparatus with the above-described construction can be controlled in a manner substantially similar to that described above with reference to FIG. 5.

When open type speed sensors (of the type utilizing a square-shaped linear voice coil as described above in the first and the second embodiments and the modification thereof) are used, the magnetic flux from the coil mounted on the moving member leaks to the exterior so that, in order to generate current of the magnitude needed to detect the displacement speed of the head carriage, it is preferable to increase the coil in size accordingly. Furthermore, detection of the displacement speed by the speed sensor may be adversely affected by external strong magnetic fields, undetermining the accuracy of the displacement speed detected. However, such problems will never be encountered in the speed sensor 64 used in the present embodiment.

According to the third embodiment, the speed sensor has a cylindrical linear voice coil which is surround by a cylindrical iron yoke. As a result the magnetic flux is prevented from leaking to the exterior and there is no magnetic flux loss. A linear voice coil sufficient in size to derive a current sufficient to permit the detection of the displacement speed can be used. Furthermore, the speed sensor is not adversely affected by exterior magnetic fields, so that erroneous measurements can be avoided and therefore the displacement speed can be measured with a high degree of accuracy.

In the third embodiment shown in FIGS. 12 and 13, instead of a speed sensor with the construction described above with reference to FIGS. 3 and 4, a cylindrical linear voice coil is used as has previously been noted. A cylindrical linear voice coil may be also used in VCM 10 for driving the head carriage.

It is also possible to use a cylindrical voice coil in the second embodiment described above with reference to FIGS. 7 and 8 and the modification thereof described above with reference to FIG. 10.

Next to be described will be an embodiment of electrical means for protecting data from mechanical external disturbances such as impacts in the first embodiment described above with reference to FIGS. 3 and 4, the second embodiment described above with reference to FIGS. 7 and 8, the modification of the second embodiment described above with reference to FIG. 10, and the third embodiment described above with reference to FIGS. 12 and 13.

Figure 14:
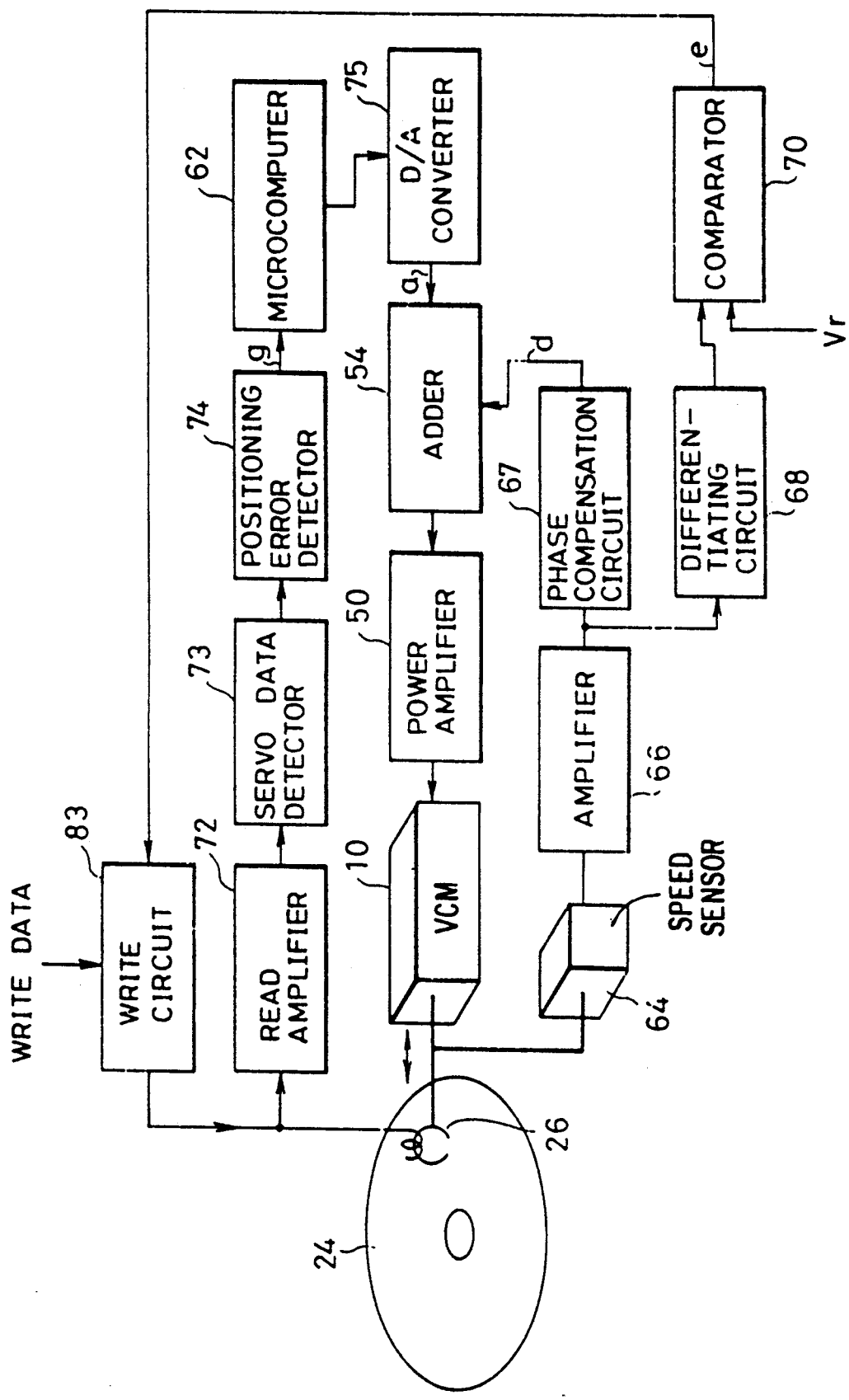
FIG. 14 is a block diagram illustrating another control system for a magnetic disc apparatus, and centers about means for protecting stored data against external mechanical disturbances.

FIG. 14 is a block diagram illustrating a control system which is especially centered about data protective means for a disc apparatus.

A write circuit 83 receives "write data" and supplies a "write" current to the head 26, which in turn writes the data on the surface of the disc 24. The write circuit 83 is controlled in response to the output signal from the comparator 70. Comparator 70 compares a predetermined threshold value Vr with the output derived from the differentiating circuit 68, which differentiates the output from the speed sensor 64. More particularly, when the output representative of the acceleration derived by differentiation of the output from the speed sensor 64 is not in excess of the threshold value Vr (that is, when the acceleration of the head is less than or equals to a predetermined acceleration represented by the threshold value Vr), the "write" circuit is permitted to be energized, but when the acceleration applied to the head 26 is in excess of a predetermined acceleration represented by the threshold voltage Vr, activation of the "write" circuit is inhibited.

Referring still FIG. 14, the mode of operation of the control system for the disc apparatus will be described in detail below.

First, in the "write" mode, the disc 24 is spun at a predetermined rotational speed by a motor (not shown) and a recording current is supplied to the head 26 in response to the data signal delivered from the "write" circuit 83. As a result, data is written on a desired track on the surface of the disc 24. As was described above with reference to FIG. 5, VCM 10 is energized so that the head 26 is positioned on the desired track on the surface of the disc 24.

Figure 1:
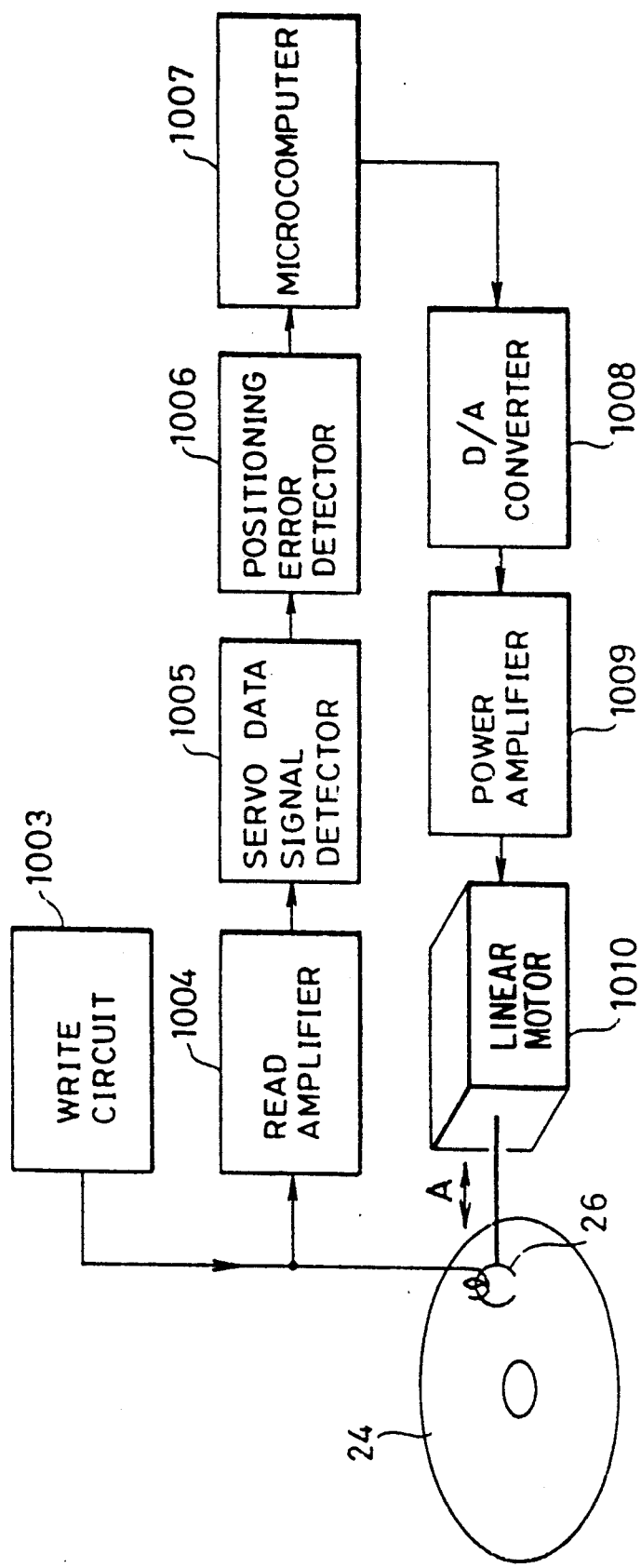
FIG. 1 is a block diagram illustrating the control system of a convention recording and/or reproducing apparatus.
Figure 2:
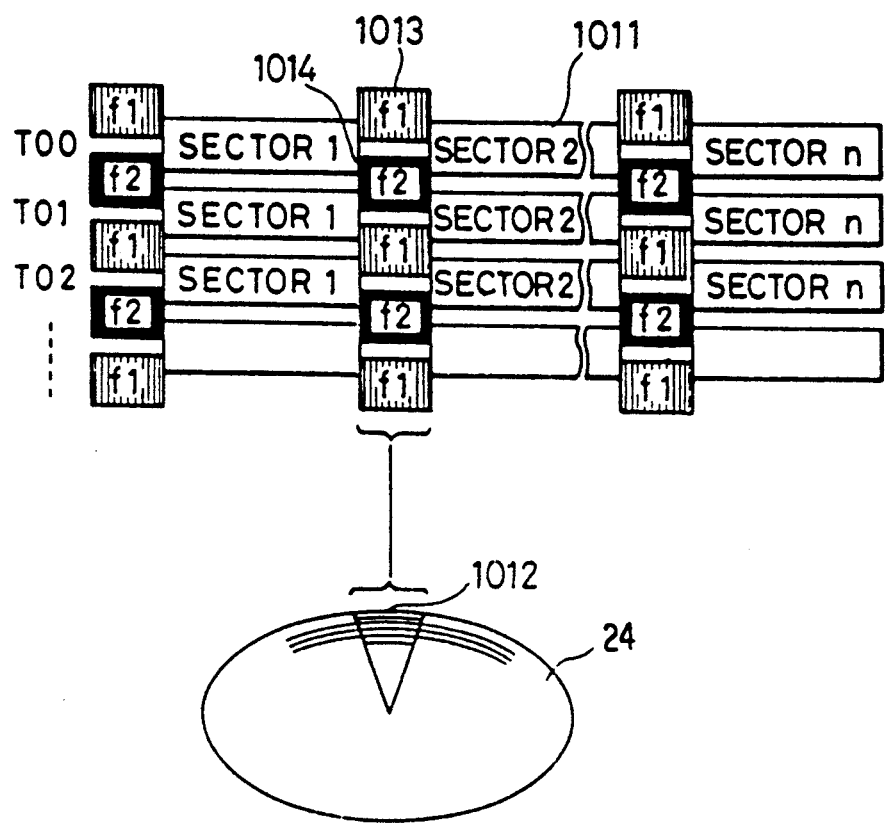
FIG. 2 is a view used to explain tracks defined on a magnetic disc and servo data recorded on the magnetic disc.

Meanwhile, in response to a "read" signal from the head 26 and amplified by the read amplifier 72, the servo data detector 73 extracts the servo signal recorded on the track as shown in FIG. 2, and in response to the components $f_1$ and $f_2$ of the servo signal thus extracted, the positioning error detection circuit 74 outputs a signal representative of the difference between the present position of the head 26 and the desired track on the surface of the disc 24. This output signal, called the position error difference signal, is delivered to the microcomputer 62, which in turn computes the distance over which the head 26 is to be displaced to position it on the desired recording track on the surface of the disc 24. This output signal from the microcomputer 62 is delivered to the D/A converter 75 and is converted into an analog signal, which in turn is delivered through the adder 54 and the power amplifier 50 to VCM 10 so that the head position is corrected. Thus automatic head tracking is accomplished. That is, in order to carry out such automatic tracking, in response to a slight movement of the head 26, feedback control is carried out. Since the output from the speed sensor 64 for sensing the displacement speed of the head carriage 18 is delivered through the phase compensation circuit 67 to the adder 54, the deviation of the position of the head 26 due to its own vibration and external vibration can be controlled by the feedback system. In normal operation, no positional deviation of the head 26 with respect to the desired recording track over the surface of the disc 24 due to the eccentricity, dimensional error, vibration thereof and so on, results. Therefore the head 26 can correctly track the desired recording track.

When an external impact is exerted on the disc apparatus, the head carriage 18 (and consequently the head 26) deviates from the center line of the track by a distance substantially in proportion to the acceleration applied to the head 26. This deviation is detected by the speed sensor 64 and is differentiated into an acceleration component by the differentiating circuit 68. The differentiated signal is delivered to the comparator 70 which compares the output from the differentiating circuit with the predetermined threshold level Vr. The threshold level Vr is selected to correspond to the output from the differentiating circuit 68 when the maximum acceleration value occurs which can be controlled by the feedback control loop while tracking the desired recording track. Here, the loop consists of the head 26, the speed sensor 64, the adder 54, the power amplifier 50, VCM 10 and then again the head 26. When the output from the differentiating circuit 68 lies within the range in which the feedback loop control system can follow the displacement of the head 26 (that is, the output is not more than the threshold level Vr), no "write" inhibition signal is derived from the comparator 70, so that the position of the head is corrected by the feedback loop and the "write" mode is carried out continuously.

On the other hand, if the output from the differentiating circuit 68 exceeds the threshold level Vr (that is, if the speed of the head carriage 18 and thus the head 26 is in excess of the dynamic range of the feedback system, so that the position correction operation cannot follow the displacement of the head due to the acceleration), the comparator 70 delivers the "write" inhibition signal to the "write" circuit 83 so that the erroneous writing of data on tracks other than the desired recording track can be prevented. As a result, the destruction of the data stored in tracks adjacent the desired track due to mechanical disturbances such as external impacts exerted to the disc apparatus is prevented.

As the head 26 is tracking a desired track over the surface of the disc 24, it is moved slightly due to error signals from the servo patterns as shown in FIG. 2. Since the output of speed sensor 64 due to tracking movement of the head 26 is added to the output due to impacts, the threshold level Vr must be determined after the sensitivity of the like of the speed sensor 64 has been taken into consideration.

Furthermore, if the threshold level Vr is changed, the reliability of the apparatus against external disturbances is adjusted. The threshold level Vr may be varied in response to the conditions under which the apparatus is used.

Figure 15:
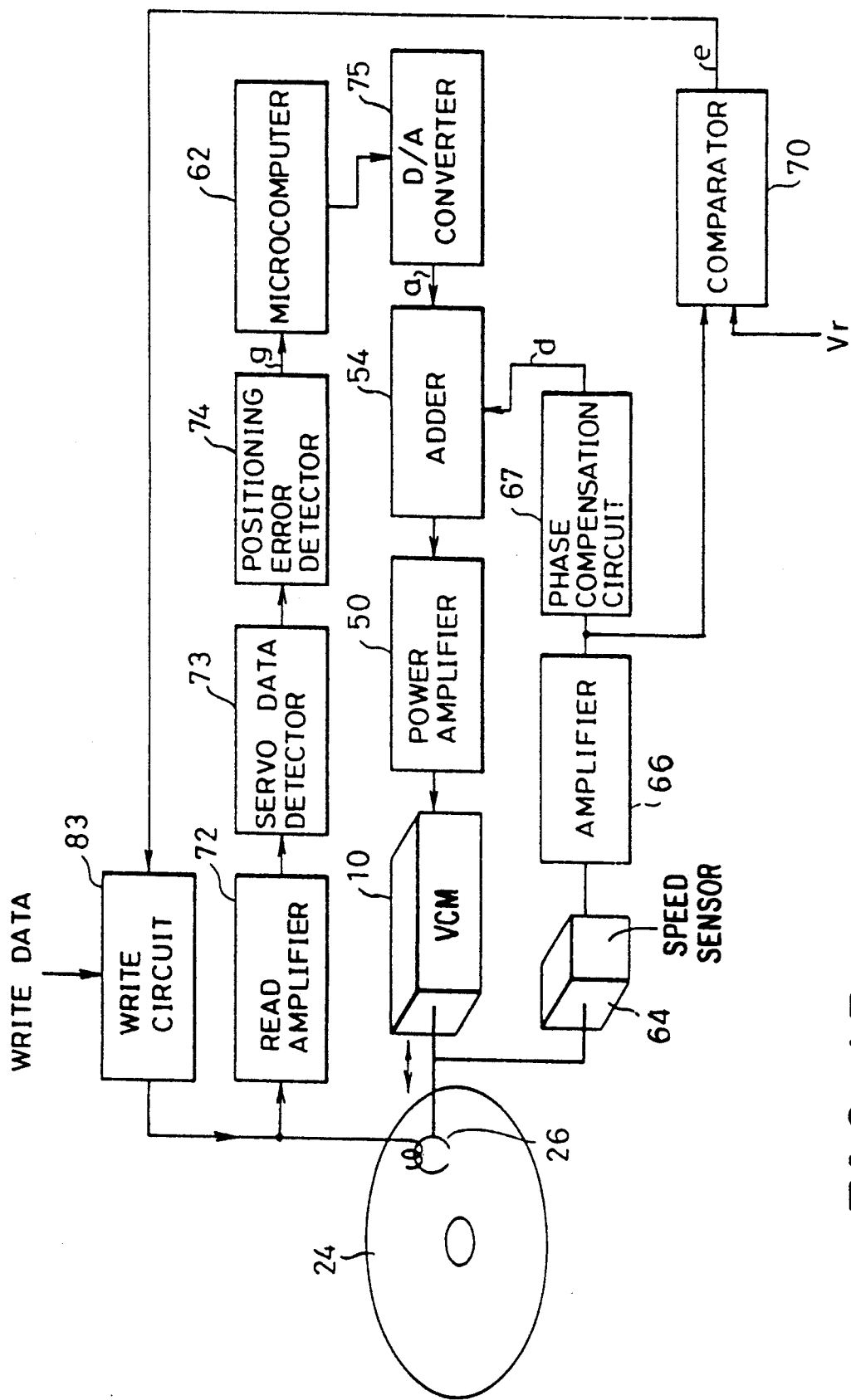
FIG. 15 is a block diagram of a further example of the control system for a magnetic disc apparatus for protecting the stored data against external mechanical disturbances.

FIG. 15 is a block diagram of a further embodiment of a control system in accordance with the present invention to prevent the destruction of stored data due to external disturbances. In the control system described above with reference to FIG. 14, the "write" circuit 83 is controlled in response to the acceleration of the head 26 or the head carriage 18 with respect to the main body of the disc apparatus, but according to the further embodiment the differentiation circuit 68 is eliminated. The amplified output from the speed sensor 64 is directly delivered to the comparator 70, so that the data required for controlling the "write" circuit 83 is obtained from the displacement speed of the head 26 relative to the disc apparatus.

If the write operation is controlled in response to the mean value of the integrated acceleration, the response characteristic is degraded relative to the detection of the acceleration, so that the response characteristic for instantaneous impact is not entirely satisfactory. However the further embodiment has the features that the control system can be made simple in construction and that its data protection capability is very effective against continuous vibrations and acceleration. Therefore either of the above-described embodiments may be suitably selected after the conditions under which the disc apparatus is used, the response characteristic of the servo system, the sensitivity and the like have been taken into consideration.

As was described above with reference to FIG. 5, the output from the comparator 70 may not be directly applied to the "write" circuit 83, but may instead be delivered to the microcomputer 62 which controls all the operations of the disc apparatus. Furthermore the comparator may be eliminated and the A/D converted output from the differentiating circuit 68 or the speed sensor 64 may be delivered to the microcomputer 62. In the latter case, a time lag problem occurs due to the relatively long arithmetic operation execution time by the computer 62, but the further embodiment of the control system shown in FIG. 15 has the advantages that it can execute complicated arithmetic operations and that it can effect an optimum control.

In the embodiments shown in FIGS. 14 and 15, instead of a linear VCM, a linear stepper motor, a rotary VCM, a stepper motor, a brushless motor or the like may be used as the motor for driving the head.

As was described above, in the case of a data recording/reproducing apparatus with the above-described control system, the "write" operation is controlled in response to the relative acceleration or the relative speed between the head and the main body in such a way that, when external disturbances such as vibrations and shocks are exerted on the apparatus during the "write" mode or operation and their magnitudes are in excess of the range which can be accommodated by the system for controlling the position of the head, the "write" mode or operation is immediately interrupted. It follows, therefore, that erroneous data writing on tracks other than the desired track due to the deviation of the head caused by the external disturbances is prevented, and data already stored in other recording tracks are also protected.

In the first embodiment described above with reference to FIGS. 4 and 5, data concerning to the acceleration of the head carriage 18 is obtained by using differentiating circuit 68 to differentiate the output from the speed sensor 64, and in response to the data thus obtained, the "write" mode or operation is permitted or inhibited, thereby protecting data already stored on the disc 24. However, instead of the differentiating circuit 68, an acceleration sensor can be disposed at a suitable position on the apparatus main body and the output from the acceleration sensor can be compared with a reference value by a comparator, with the "write" mode or operation being controlled by the output of the comparator.

If an acceleration sensor is employed in order to protect the stored data during the "write" mode when external disturbances are exerted on the apparatus, and if a speed signal is not needed by the control system, then the speed sensor 64 or the like may be eliminated.

Figure 16:
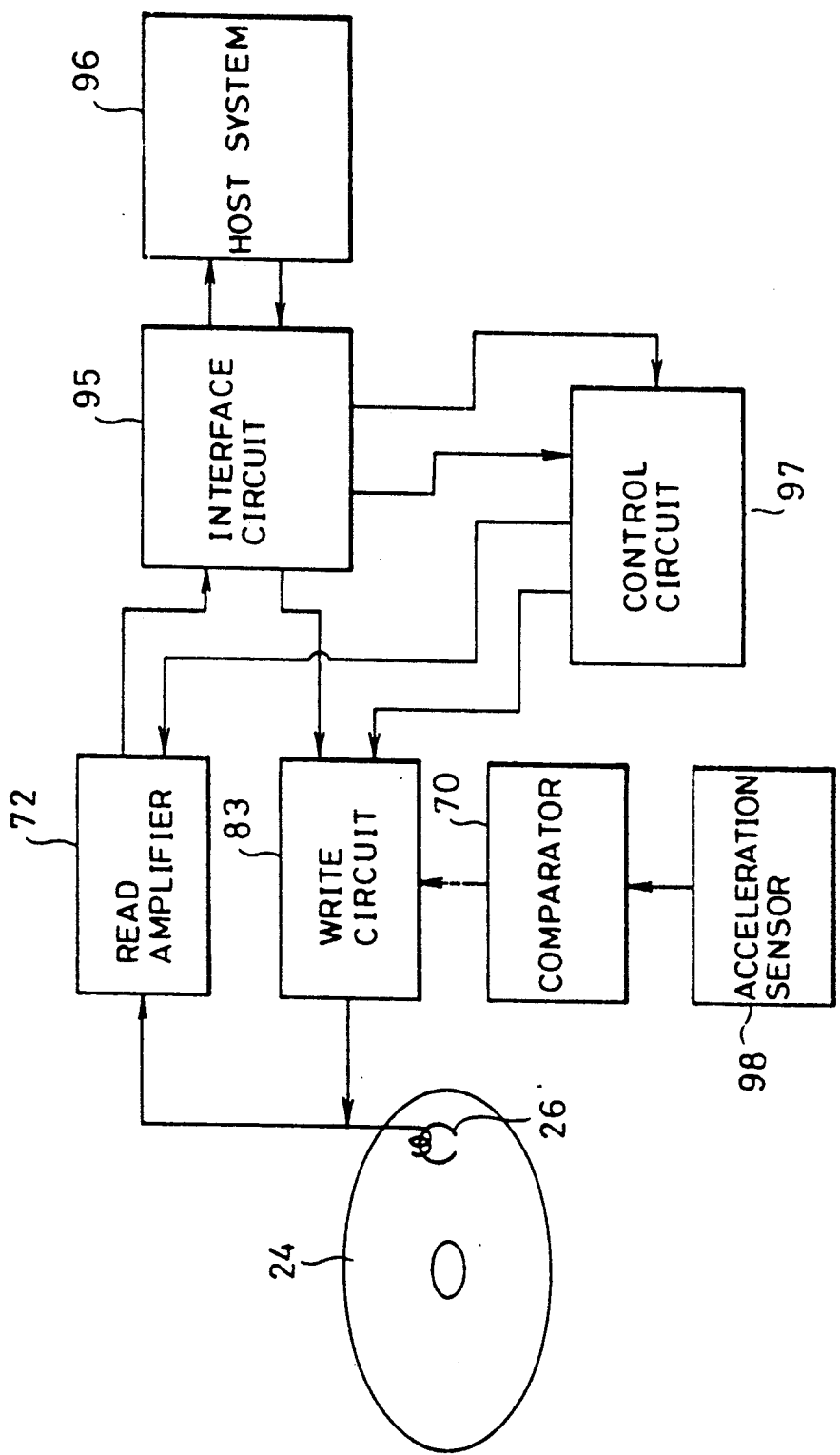
FIG. 16 is a block diagram of a yet further example of a control system for a magnetic disc apparatus.

FIG. 16 is a block diagram illustrating yet a further embodiment of a control system in accordance with the present invention for a disc apparatus of the type not utilizing a speed sensor or the like. Read data, write data and other control signals are exchanged between an interface 95 and an external host system 96, which is generally a person computer or a word processor. A control circuit 97 corresponds to the above-mentioned microcomputer 62 and controls all the operations of the disc apparatus. An acceleration sensor 98 is adapted to detect acceleration caused by a external mechanical disturbance exerted on the disc apparatus. The output of the acceleration sensor 98 is delivered to the comparator 70, which detects whether or not the output from the sensor 98 is in excess of a predetermined level.

Figure 17:
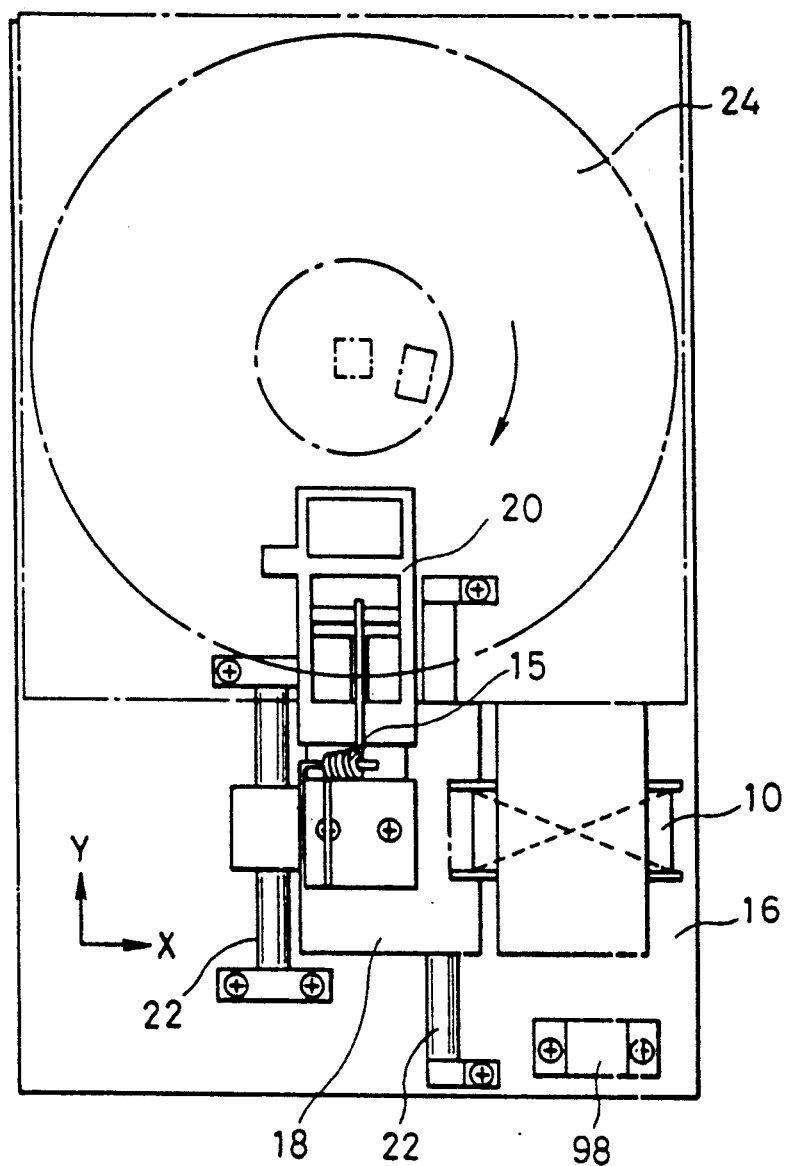
FIG. 17 is a top view illustrating the mechanical construction of a magnetic disc apparatus incorporating therein the control system shown in FIG. 16.

FIG. 17 is a top view illustrating the mechanical arrangement of a disc apparatus to which the control system shown in FIG. 16 is applied. The same reference numerals are used to designate similar parts in both FIGS. 3 and 17.

The whole disc apparatus is supported by a base 16 upon which the acceleration sensor 98 is securely mounted to detect acceleration in the direction Y (that is, the direction in which the head 26 is displaced).

VCM 10 drives the head carriage 18 so as to bring the head 26 to a desired track of the disc 24 so that "read" or "write" operations may be carried out. When an external shock or other impact is exerted on the apparatus in the direction Y during a "write" operation, the head 26 deviates from the center line of the track which the head 26 is tracking. The acceleration sensor 98 generates an output in proportion to the magnitude of the external impact exerted on the disc apparatus and delivers it to the comparator 70, which, in turn, detects whether or not the magnitude of the external mechanical disturbance exerted on the disc apparatus is in excess of a tolerance.

If the magnitude of the external mechanical disturbance exerted to the disc apparatus is in excess of the tolerance, the comparator 70 delivers an inhibit signal to the "write" circuit 83 so as to inhibit the operation thereof. Thus, the destruction of the stored data on tracks adjacent the desired track is prevented. In this case, the data which has been stored on the desired track is not in a satisfactory state, but after a "write" operation, the host system 96 verifies the data stored on the desired track and if it is unsatisfactory, the data can be rewritten again.

In a modification of the embodiment of the control system shown in FIG. 16 the output from the comparator 70 can also be delivered to the control circuit 97 so that the external host system 96 is informed of the interruption of the "write" operation through the interface 95. In this case, the output from the comparator 70 is not delivered directly to the "write" circuit 83, but is instead delivered through the control circuit 97 to interrupt the "write" operation.

A suitable integrator or the like may be interposed between the acceleration sensor 98 and the comparator 70 so as to detect whether or not the integrated value or impulse of the external force exerted on the disc apparatus per unit time is within the tolerance range.

So far the control system shown in FIG. 16 has been described as being applied to a magnetic disc apparatus, but is to be understood that it may be equally well applied to optical disc apparatuses, optical card apparatuses and the like.

Furthermore instead of a linear VCM, a linear motor such as a linear stepper motor, a rotary voice coil motor, a stepper motor, a brushless motor or the like may be used as the motor for driving the head.

According to the control system described above with reference to FIG. 16, in response to the output from the acceleration sensor, the "write" operation for writing data on a desired track on the disc is interrupted or inhibited to prevent the destruction of important data, and therefore the disc apparatus is highly reliable in operation.

In the embodiments described above, it has been explained that the "write" operation is controlled in response to the output from the speed sensor or acceleration sensor, but according to the present invention it is not necessary to interrupt or inhibit the "write" operation in response to the detection of external mechanical disturbances. It is possible to prevent the head from deviating from the center line of the desired track which the head is tracking even if external mechanical disturbances are exerted on the disc apparatus, thereby preventing the destruction of the data stored in tracks adjacent the desired track.

Figure 18:
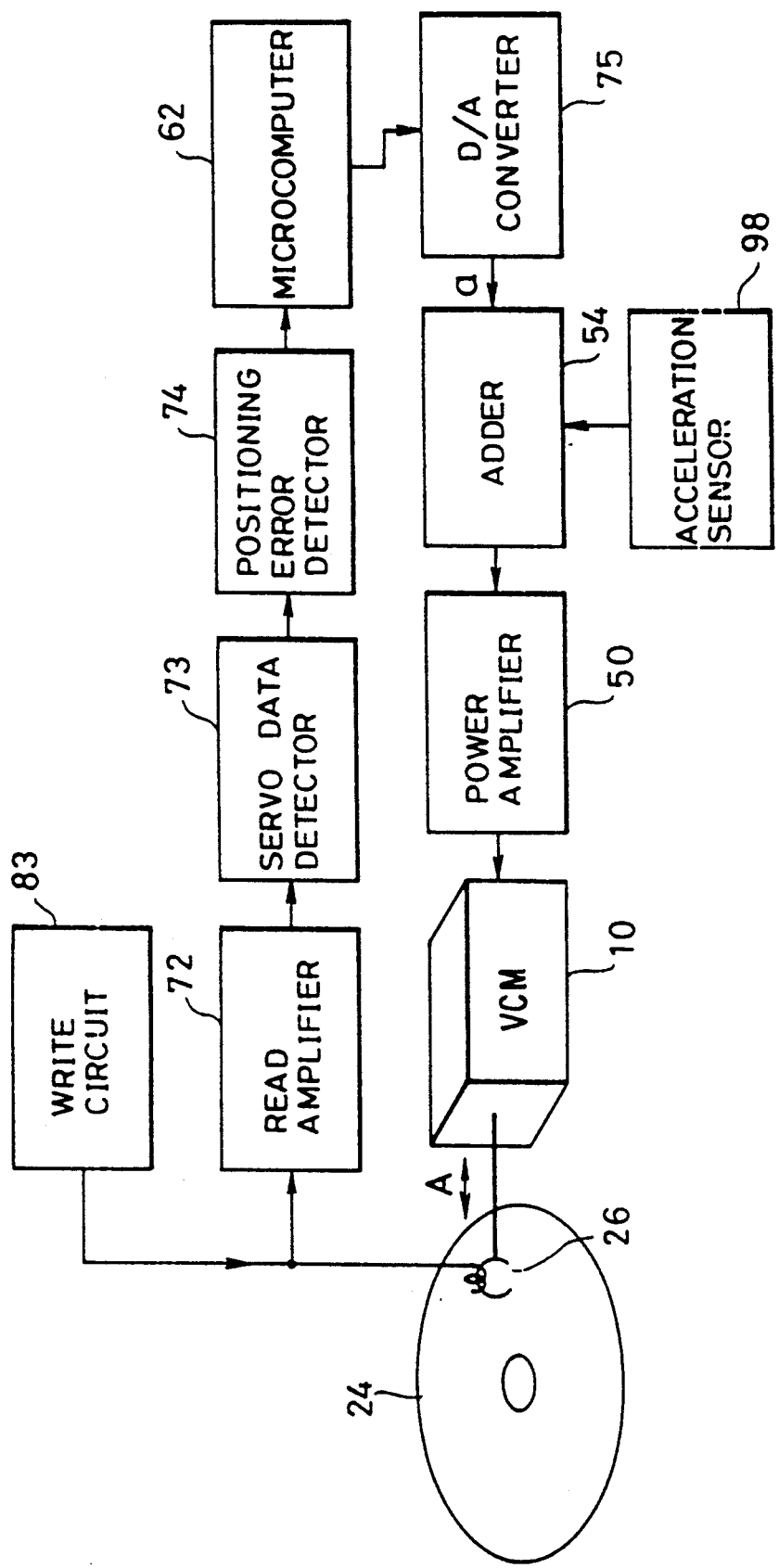
FIG. 18 is a block diagram illustrating still a further example of a control system for a magnetic disc apparatus for correcting the position of a head in response to external mechanical disturbances.

Such a control system is illustrated in FIG. 18 and may be applied to a disc apparatus of the type shown in FIG. 17.

The output from the acceleration 98 for detecting acceleration in the direction of displacement of the head 26 (the Y-direction) is delivered to the adder 54 and added to the motor control output a from the D/A converter 75. The output of the adder 54 is delivered to the power amplifier 50.

When no external mechanical disturbance is exerted on the device, a position error is computed from the servo data on the disc 24 and the head is positioned on the desired track on the disc 24. When an external mechanical disturbance is exerted on the apparatus in the direction Y, the acceleration sensor 98 generates a positive voltage which is delivered through the adder 54 and the power amplifier 50 to VCM 10, thereby displacing the head carriage 18 in the Y direction. Meanwhile, due to the external mechanical disturbance exerted to the apparatus, the whole apparatus is forced to move in the Y direction, so that when the sensitivity of the acceleration sensor 98 is suitably selected, the position of the head carriage 18 relative to the main body of the apparatus is not changed at all. That is, the relative relationship between the position of the head 26 and the center line of the desired track which the head 26 is tracking is not adversely affected by the external mechanical disturbance exerted to an apparatus.

a control system of the type shown in FIG. 18 is can be modified so that the adder 54 is eliminated and so that the output from the acceleration sensor 98 is delivered through an A/D converter to the microcomputer 62, which executes suitable arithmetic operations. In this case, due to the A/D conversion and the arithmetic operations executed in the microcomputer 62, the response characteristic is degraded, but the control system can be made simple in construction.

Furthermore, the control loop can comprise hardware without utilizing the microcomputer 62. Instead of a linear motor such as a linear VCM or a linear stepper motor, a rotating motor may be used as the carriage head driving means. However, it is to be noted that when a linear VCM or a rotating type VCM is used as the means for driving the head, it suffices to execute a simple addition, but when a linear stepper motor or a rotating type stepper motor is used, relatively complex arithmetic operations must be executed.

The control system as shown in FIG. 18 has been described as being applied to a magnetic disc apparatus, but it is apparent that it may be equally well applied optical disc apparatuses, optical card apparatuses and so on. Furthermore, the control system has been described as being applied to an intermittent servo system type disc apparatus, but it may be equally well applied an apparatus with a continuous servo system so that the servo capability may be further enhanced.

Figure 5:
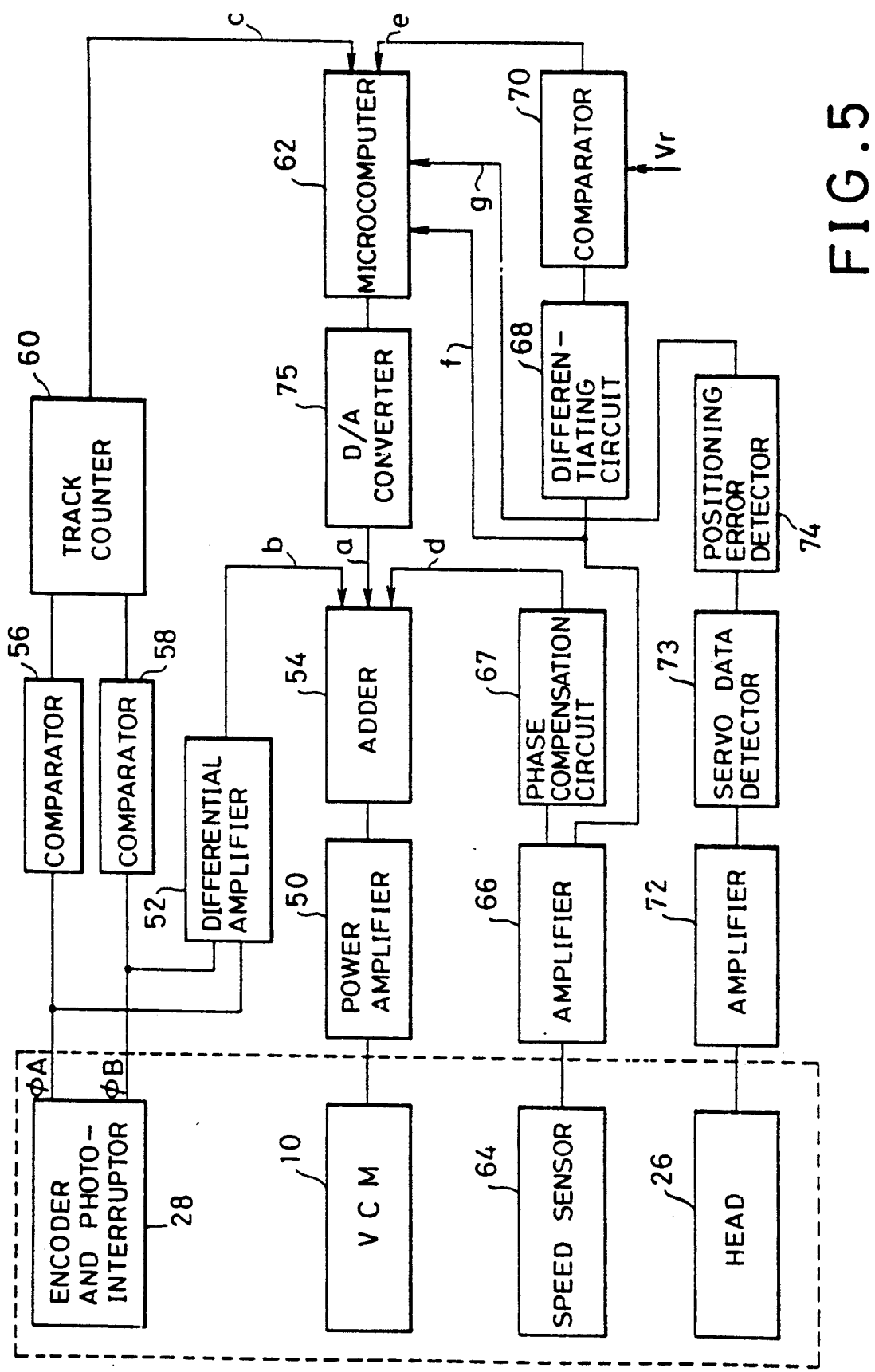
FIG. 5 is a block diagram illustrating one example of a control system for the first preferred embodiment, and is especially centered about means for controlling the position of a head.

Furthermore, if the control system is applied to, for example, the control system shown in FIG. 5, the differentiated output of the speed sensor 64 may be delivered to the adder.

In any event, when the data representative of the acceleration is applied to the tracking servo loop, read errors and the destruction of the data stored in the adjacent recording tracks are prevented and the apparatus becomes more highly reliable in operation.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A recording and/or reproducing apparatus, comprising:
    a head means for writing data into and/or reading data out of a recording medium;
    a displacing means for displacing said head means along a path to a write or read region on said recording medium, said displacing means including a motor having a first moving member that is disposed on one side of said path, and joining means for joining said head means to said first moving member;
    a speed sensor means for detecting the displacement speed of said head means, said speed sensor means including a second moving member that is disposed on the other side of said path, said second moving member being coupled to said displacing means; and
    control means for permitting or inhibiting a write operation by said head means in response to the displacement speed of said head means detected by said speed sensor means, said control means inhibiting the write operation by the head means if the displacement speed of said head means exceeds a predetermined value.

2. A recording and/or reproducing apparatus as claimed in claim 1, wherein said motor is a linear voice coil motor; and wherein said speed sensor means has a coil wound around said second moving member, a yoke extending through said coil and securely attached to said apparatus, and a magnet combined with said yoke.

3. A recording and/or reproducing apparatus as claimed in claim 1, wherein said recording medium is in the form of a disc having surfaces on which are defined a plurality of write or read regions; and wherein said head means is moved toward or away from the center of said disc when it is displaced along said path by said displacing means.

4. A recording and/or reproducing apparatus as claimed in claim 3, wherein said disc is a magnetic disc; and wherein said head means is a magnetic head.

5. A recording and/or reproducing apparatus as in claim 1, wherein said speed sensor means generates a speed signal, and wherein said control means comprises a differentiating circuit means for differentiating the speed signal from said speed sensor means to provide a differentiated signal, said write operation being inhibited when said differentiated signal from said differentiating circuit means is in excess of a predetermined level.

6. A recording and/or reproducing apparatus as claimed in claim 1, wherein said joining means comprises a head carriage on which said head means is mounted, and means for connecting said first moving means to said head carriage, said second moving member additionally being connected to said head carriage.

7. A recording and/or reproducing apparatus, comprising:
    a head means for writing data into and/or reading data out of a recording medium;
    a head displacement means for displacing said head means to a write or read region on said recording medium;

a speed sensor means for detecting the displacement speed of said head means, said speed sensor means including a coil assembly having a first coil movable in unison with said head means and a second coil which is maintained stationary relative to said head means and which is wound in a direction opposite to the direction of winding of said first coil, a voltage being induced across said coil assembly in accordance with the displacement speed of said head means when said head means is displaced; and control means for controlling said head means so as to inhibit a write operation by said head means if the displacement speed detected by said speed sensor means exceeds a predetermined value.

8. A recording and/or reproducing apparatus as claimed in claim 7, wherein said head displacement means comprises a head carriage on which said head means is mounted, and a linear voice coil motor equipped with a moving member that is joined to said head carriage.

9. A recording and/or reproducing apparatus as claimed in claim 8, wherein said head displacement means displaces said head means along a path; wherein said moving member is disposed on one side of said path; and wherein said speed sensor means further comprises another moving member that is disposed on the other side of said path, said first coil being wound around said another moving member.

10. A recording and/or reproducing apparatus, comprising:

a head means for writing data into and/or reading data out of a recording medium;

a head displacement means for displacing said head means along a path to a write or read region on said recording medium; and a speed sensor means for detecting the displacement speed of said head means, said speed sensor means including
  a first yoke in the shape of a hollow cylinder disposed parallel to said path,
  a magnet lining on the inner surface of said first yoke,
  a second yoke in the shape of a rod disposed coaxially in said first yoke, and
  a moving member which is joined to said head displacement means through a slit cut through said first yoke and said magnetic lining, said slit being parallel to said path so as to permit said moving member to be movable in unison with said head means along said second yoke, and
  a coil wound around said moving member.

11. A recording and/or reproducing apparatus as claimed in claim 10, wherein said head displacement means comprises a head carriage on which said head means is mounted, and a linear voice coil motor which has a moving member that is connected to said head carriage.

12. A recording and/or reproducing apparatus as claimed in claim 11, wherein said moving member of said linear voice coil motor and said movable member of said speed sensor means are arranged at the opposite sides of said path.

13. A recording and/or reproducing apparatus, comprising:

a head means for writing data into and/or reading data out of a recording medium;

a head displacement means for displacing said head means to a write or read region on said recording medium;

an acceleration data generating means for generating an output signal representing the acceleration of said head means relative to said recording medium, said acceleration data generating means being connected directly to said head displacement means to detect movement of said head displacement means; and a control means for permitting or inhibiting a write operation by said head means in response to the output signal of said acceleration data generating means, said control means inhibiting the write operation by said head means if the output signal exceeds a predetermined value.

14. A recording and/or reproducing apparatus as claimed in claim 13, wherein said acceleration data generating means comprises a speed sensor means for detecting the relative speed of said head means with respect to said recording medium to provide a speed signal, and a differentiating circuit means for differentiating the speed signal to thereby provide said output signal of said acceleration data generating means, the write operation by said head means being inhibited when the output signal from said acceleration data generating means is in excess of the predetermined value.

15. A recording and/or reproducing apparatus as claimed in claim 13, wherein said acceleration data generating means comprises an acceleration sensor means for detecting the acceleration of said head means relative to said recording medium and providing said output signal of said acceleration data generating means, the write operation by said head means being inhibited when the output signal from said acceleration data generating means is in excess of the predetermined value.

16. A recording and/or reproducing apparatus, comprising:

a head means for writing data into and/or reading data out of a recording medium;

a head displacement means for displacing said head means relative to said recording medium so as to position said head means on a write or read region of said recording medium;

an acceleration data generating means for generating an output signal representing the relative acceleration of said head means with respect to said recording medium, said acceleration data generating means being connected directly to said head displacement means to detect movement of said head displacement means; and a control means for causing said head displacement means to displace said head means by a distance related to the acceleration in response to the output signal of said acceleration data generating means.

17. A recording and/or reproducing apparatus as claimed in claim 16, wherein said head displacement means includes a motor; wherein said acceleration data generating means comprises an acceleration sensor which provides said output signal; and wherein said control means comprises means for adding said output signal to data for energizing said motor.

18. A recording and/or reproducing apparatus as claimed in claim 17, wherein said means for adding comprises an adder.

19. A disc drive apparatus, comprising:

a head means for writing data into and/or reading data out of a disc;

a head displacement means for displacing said head means in a radial direction of said disc to write or read region on said disc;

an acceleration data generating means for generating an output signal representing the acceleration of said head means in said radial direction, said acceleration data generating means being connected directly to said head displacement means to detect acceleration of said head displacement means, said acceleration data generating means including a speed sensor means for detecting the relative speed of said head means with respect to said disc to provide a speed signal, and a differentiating circuit means for differentiating the speed signal to thereby provide said output signal of said acceleration data generating means; and a control means for permitting or inhibiting a write operation by said head means in response to the output signal of said acceleration data generating means, said control means inhibiting the write operation by said head means if the output signal exceeds a predetermined value.

* * * * *